United States Patent
Usoro et al.

(10) Patent No.: US 6,783,477 B2
(45) Date of Patent: Aug. 31, 2004

(54) FAMILY OF SIX-SPEED DUAL-CLUTCH TRANSMISSIONS HAVING THREE PLANETARY GEAR SETS

(75) Inventors: Patrick Benedict Usoro, Troy, MI (US); Chunhao J. Lee, Troy, MI (US); Paul D. Stevenson, Ann Arbor, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/323,072

(22) Filed: Dec. 18, 2002

(65) Prior Publication Data

US 2004/0121875 A1 Jun. 24, 2004

(51) Int. Cl.[7] .................................................. F16H 3/62
(52) U.S. Cl. ....................... 475/276; 475/280; 475/296
(58) Field of Search ................................ 475/276, 280, 475/282, 284, 286, 296, 314, 320, 326, 330

(56) References Cited

U.S. PATENT DOCUMENTS

| | | | |
|---|---|---|---|
| 4,070,927 A | 1/1978 | Polak | 74/765 |
| 4,709,594 A | 12/1987 | Maeda | 74/753 |
| 5,106,352 A | 4/1992 | Lepelletier | 475/280 |
| 5,385,064 A | 1/1995 | Reece | 74/331 |
| 5,497,867 A | 3/1996 | Hirsch et al. | 192/48.91 |
| 5,560,461 A | 10/1996 | Loeffler | 192/53.32 |
| 5,599,251 A | 2/1997 | Beim et al. | 475/275 |
| 5,641,045 A | 6/1997 | Ogawa et al. | 192/53.341 |
| 5,643,125 A * | 7/1997 | Long et al. | 475/127 |
| 5,651,435 A | 7/1997 | Perosky et al. | 192/24 |
| 5,975,263 A | 11/1999 | Forsyth | 192/53.32 |
| 6,053,839 A | 4/2000 | Baldwin et al. | 475/281 |
| 6,071,208 A | 6/2000 | Koivunen | 475/275 |
| 6,083,135 A | 7/2000 | Baldwin et al. | 475/276 |
| 6,217,474 B1 | 4/2001 | Ross et al. | 475/269 |
| 6,354,416 B1 | 3/2002 | Eo | 192/53.341 |
| 6,422,968 B1 * | 7/2002 | Coffey | 475/275 |
| 6,425,841 B1 * | 7/2002 | Haka | 475/286 X |

FOREIGN PATENT DOCUMENTS

| | | | | |
|---|---|---|---|---|
| JP | 402154844 | * | 6/1990 | 475/276 |
| JP | 403107652 | * | 5/1991 | 475/275 |
| JP | 404300442 | * | 10/1992 | 475/276 |
| JP | 9-126283 | | 5/1997 | |

* cited by examiner

Primary Examiner—Ha Ho
(74) Attorney, Agent, or Firm—Kathryn A. Marra

(57) ABSTRACT

The family of transmissions has a plurality of members that can be utilized in powertrains to provide at least six forward speed ratios and one reverse speed ratio. The transmission family members include three planetary gear sets, two input clutches, nine, ten or eleven torque transmitting mechanisms and a fixed interconnection. The invention provides a low content multi-speed dual clutch transmission mechanism wherein the two input clutches alternately connect the engine to realize odd and even number speed ratio ranges. The torque transmitting mechanisms provide connections between various gear members, the fixed interconnection, the input clutches, the output shaft, and the transmission housing, and are operated in combinations of at least three to establish at least five forward speed ratios and at least one reverse speed ratio.

26 Claims, 12 Drawing Sheets

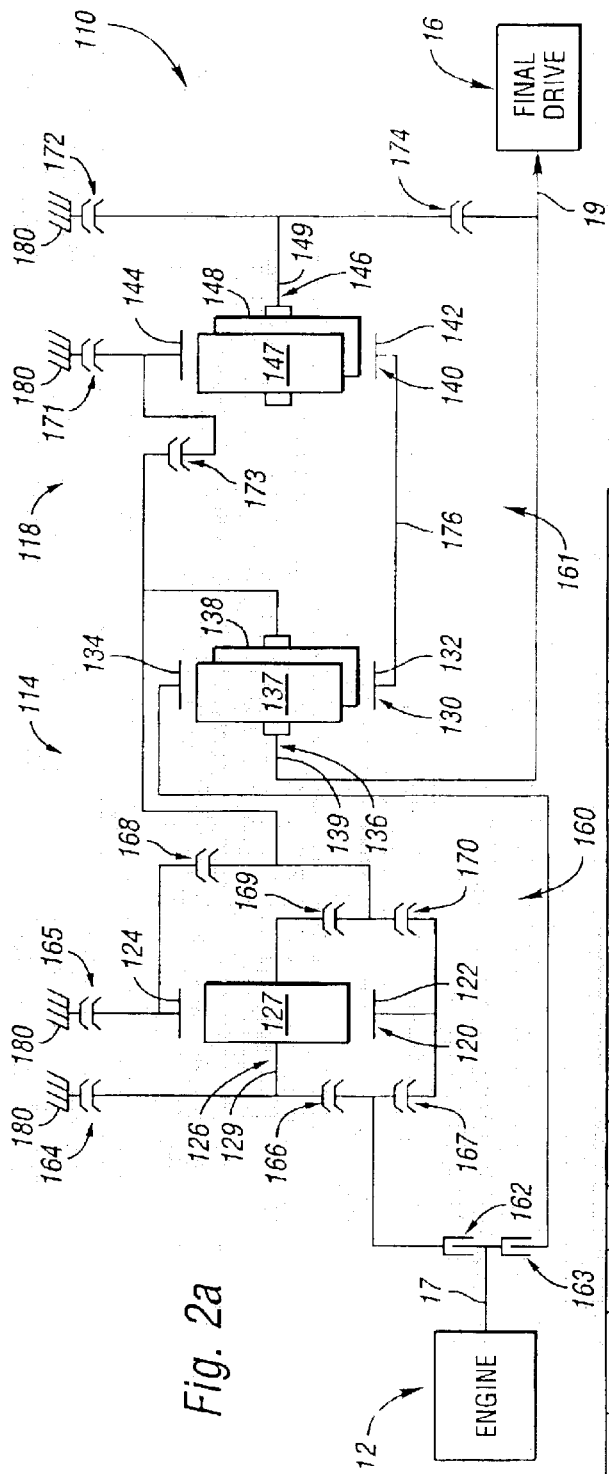

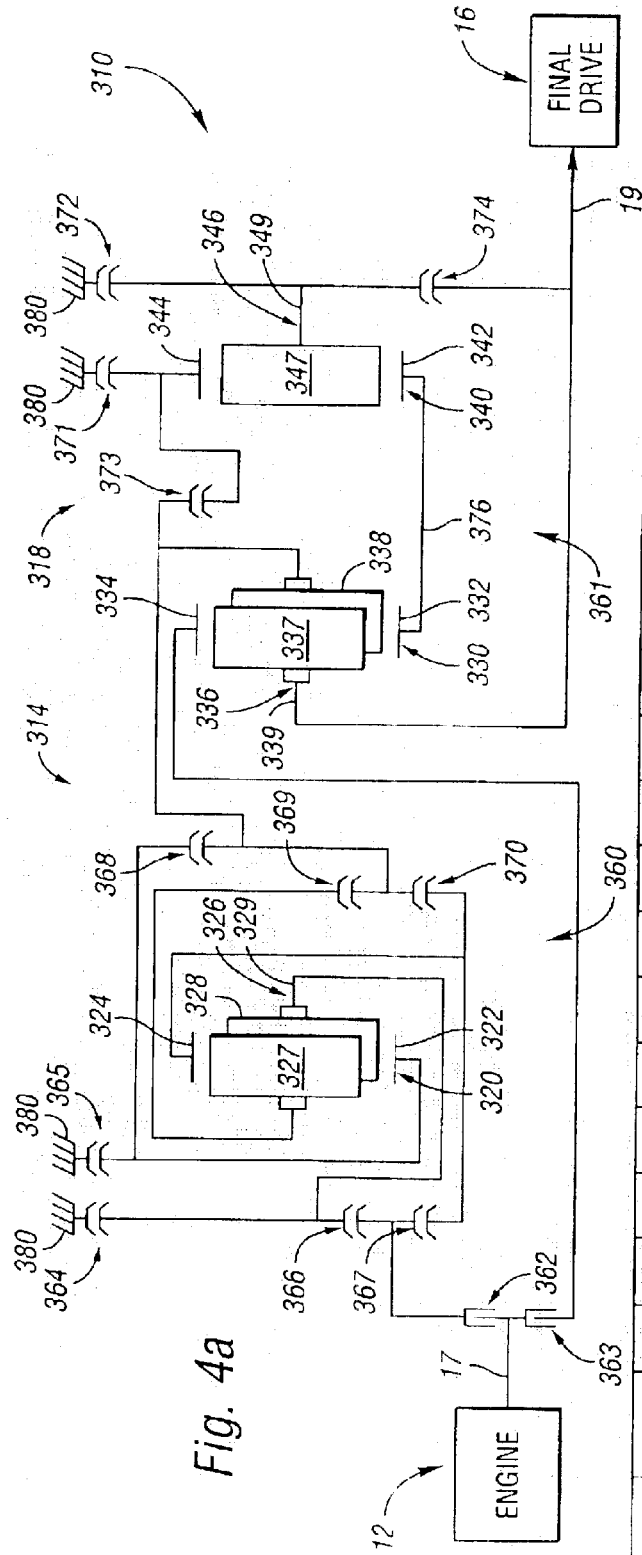

| RATIOS | 462 | 463 | 464 | 465 | 466 | 467 | 468 | 469 | 470 | 471 | 472 | 473 | 474 |
|---|---|---|---|---|---|---|---|---|---|---|---|---|---|
| REVERSE | -0.70 | X | X | | | | | | | | X | | X |
| NEUTRAL | | | | | | | | | | | | | |
| 1 | 2.12 | X | | | X | | | | | | | | X |
| 2 | 1.51 | X | | X | | X | | | | | | X | |
| 3 | 1 | X | X | | | | | X | | | | | |
| 4 | 0.66 | X | | | X | | | | | X | | X | |
| 5 | 0.42 | | | X | | | X | | | X | | | |
| 6 | 0.34 | | X | | | X | | | | | X | | X |

(X = ENGAGED CLUTCH)

RING GEAR / SUN GEAR
TOOTH RATIO:

$\frac{R_1}{S_1} = 2.98$ $\frac{R_2}{S_2} = 1.72$ $\frac{R_3}{S_3} = 1.52$

| RATIO SPREAD | 6.32 |
|---|---|
| RATIO STEPS | |
| REV/1 | -0.33 |
| 1/2 | 1.41 |
| 2/3 | 1.51 |
| 3/4 | 1.51 |
| 4/5 | 1.59 |
| 5/6 | 1.24 |

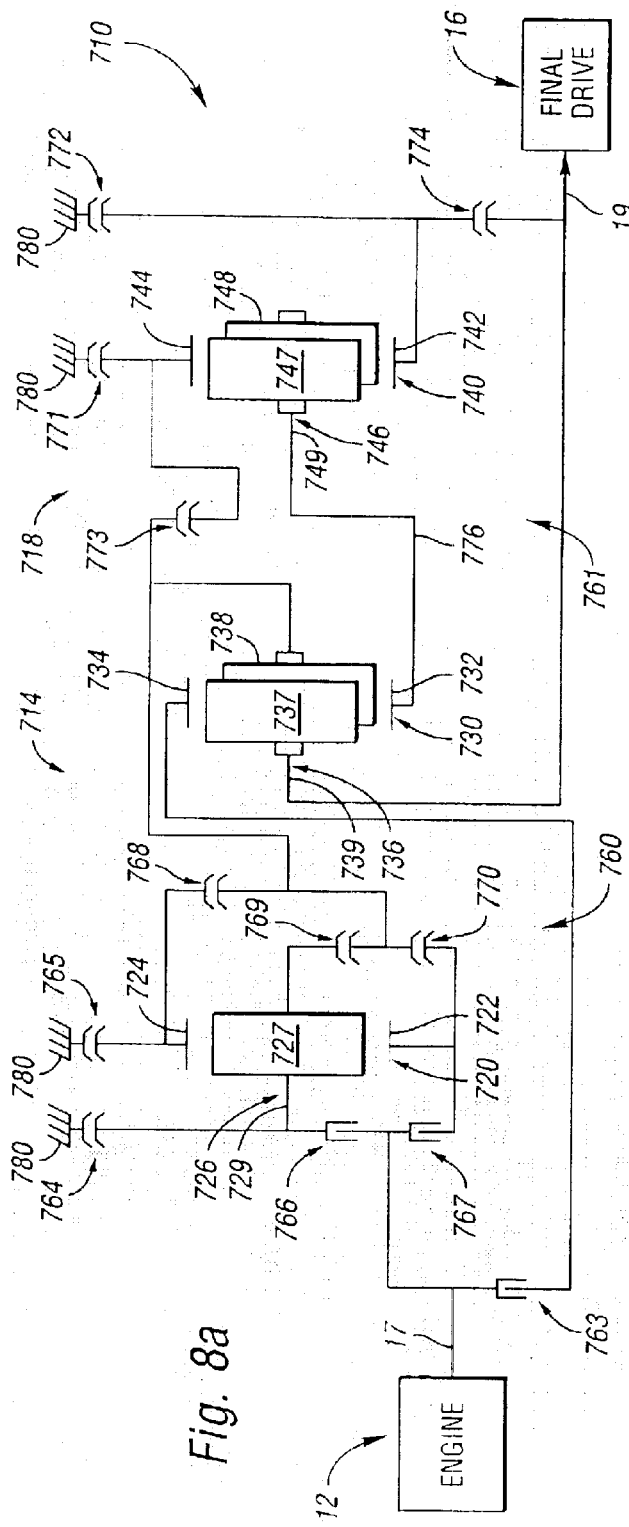

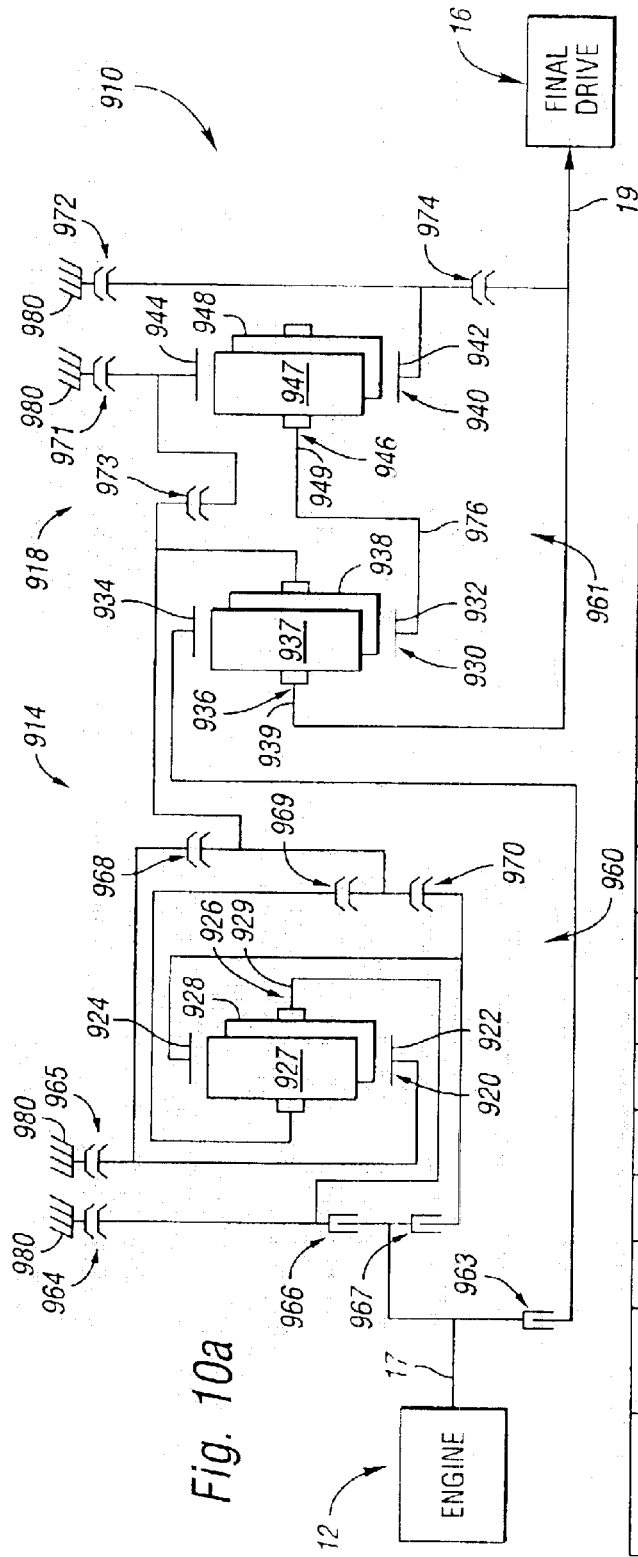

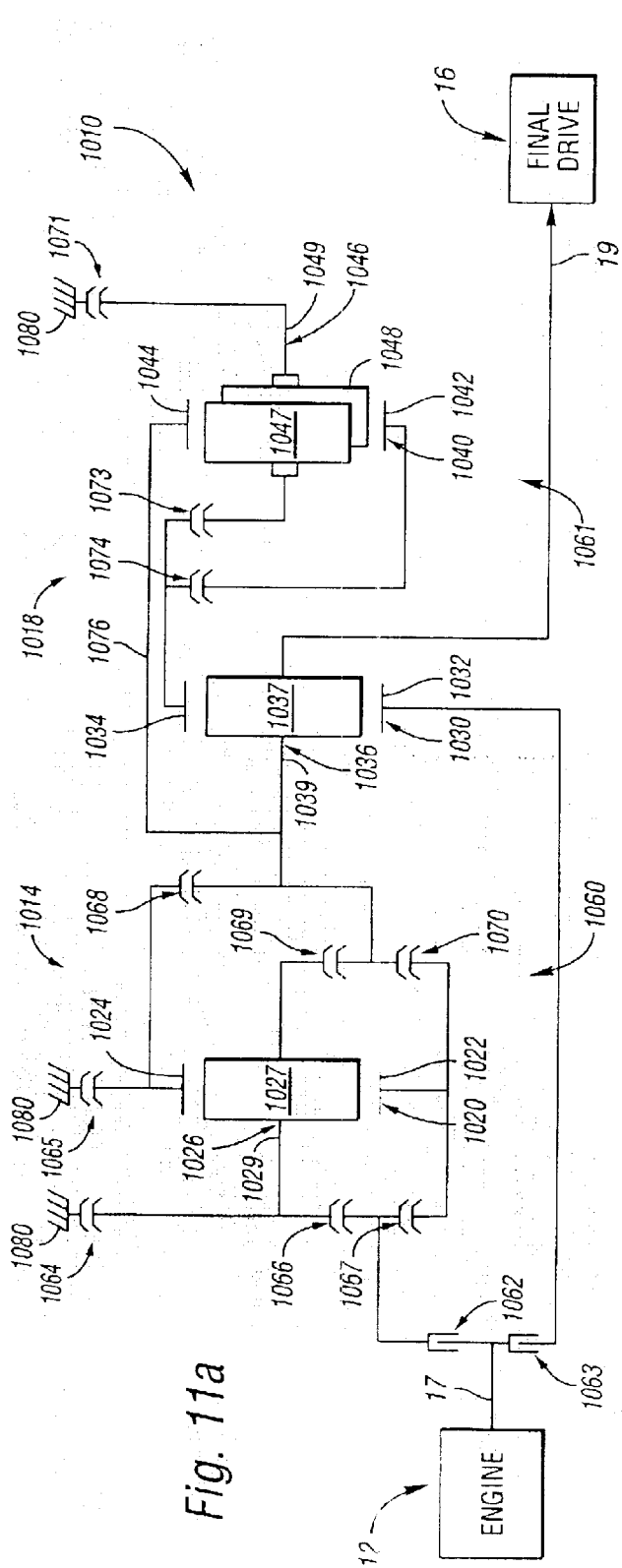

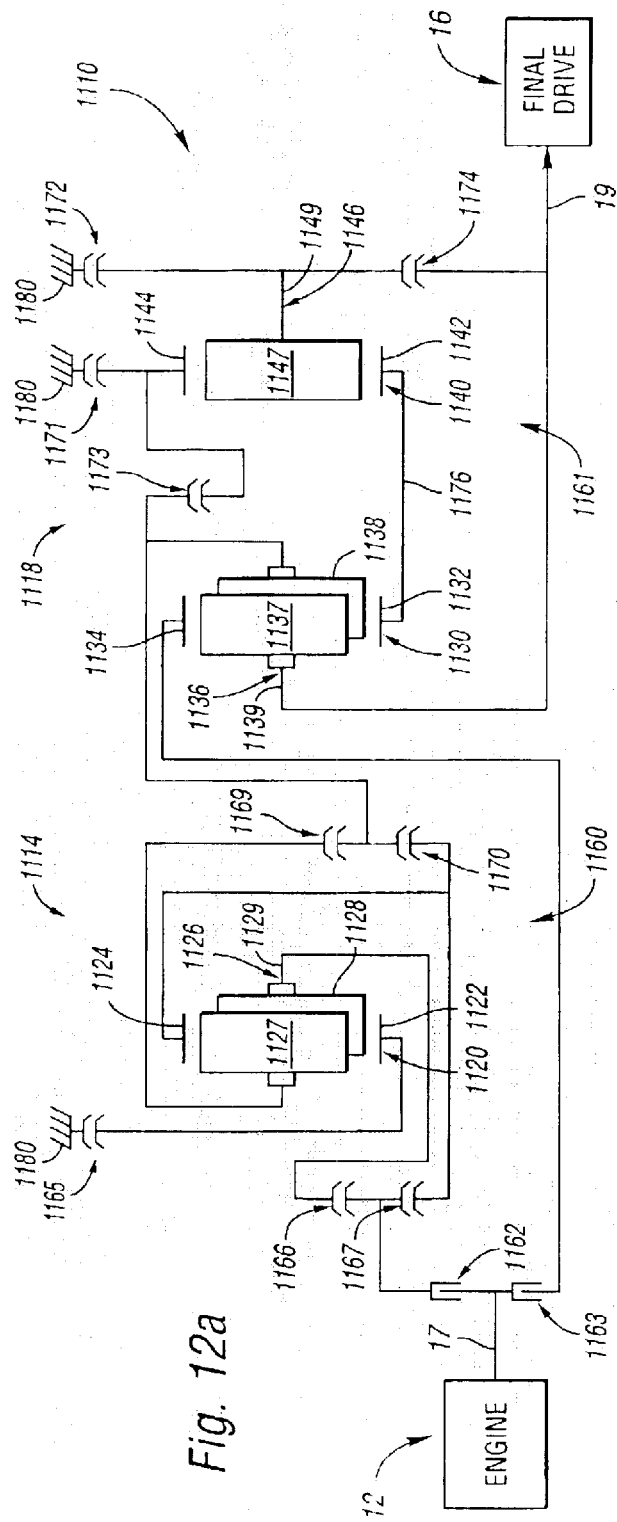

FAMILY OF SIX-SPEED DUAL-CLUTCH TRANSMISSIONS HAVING THREE PLANETARY GEAR SETS

TECHNICAL FIELD

The present invention relates to a family of power transmissions having two input clutches which selectively connect an input shaft to an arrangement of three planetary gear sets to provide at least five forward speed ratios and one reverse speed ratio.

BACKGROUND OF THE INVENTION

Passenger vehicles include a powertrain that is comprised of an engine, multi-speed transmission, and a differential or final drive. The multi-speed transmission increases the overall operating range of the vehicle by permitting the engine to operate through its torque range a number of times.

A primary focus of transmission and engine design work is in the area of increasing vehicle fuel efficiency. Manual transmissions typically provide improved vehicle fuel economy over automatic transmissions because automatic transmissions use a torque converter for vehicle launch and multiple plate hydraulically-applied clutches for gear engagement. Clutches of this type, left unengaged or idling, impose a parasitic drag torque on a drive line due to the viscous shearing action which exists between the plates and discs rotating at different speeds relative to one another. This drag torque adversely affects vehicle fuel economy for automatic transmissions. Also, the hydraulic pump that generates the pressure needed for operating the above-described clutches further reduces fuel efficiency associated with automatic transmissions. Manual transmissions eliminate these problems.

While manual transmissions are not subject to the above described fuel efficiency related problems, manual transmissions typically provide poor shift quality because a significant torque interruption is required during each gear shift as the engine is disengaged from the transmission by the clutch to allow shafts rotating at different speeds to be synchronized.

So called "automated manual" transmissions provide electronic shifting in a manual transmission configuration which, in certain circumstances, improves fuel efficiency by eliminating the parasitic losses associated with the torque converter and hydraulic pump needed for clutching. Like manual transmissions, a drawback of automated manual transmissions is that the shift quality is not as high as an automatic transmission because of the torque interruption during shifting.

So called "dual-clutch automatic" transmissions also eliminate the torque converter and replace hydraulic clutches with synchronizers but they go further to provide gear shift quality which is superior to the automated manual transmission and similar to the conventional automatic transmission, which makes them quite attractive. However, most known dual-clutch automatic transmissions include a lay shaft or countershaft gear arrangement, and have not been widely applied in vehicles because of their complexity, size and cost. For example, a dual clutch lay shaft transmission could require eight sets of gears, two input/shift clutches and seven synchronizers/dog clutches to provide six forward speed ratios and a reverse speed ratio. An example of a dual-clutch automatic transmission is described in U.S. Pat. No. 5,385,064, which is hereby incorporated by reference.

SUMMARY OF THE INVENTION

The invention provides a low content multi-speed dual-clutch transmission family utilizing planetary gear sets rather than lay shaft gear arrangements. In particular, the invention requires only three planetary gear sets, two input/shift clutches, and ten or eleven selectable torque transmitting mechanisms to provide at least six forward speed ratios and a reverse speed ratio.

According to one aspect of the invention, the family of transmissions has three planetary gear sets, each of which includes a first, second and third member, which members may comprise a sun gear, ring gear, or a planet carrier assembly member.

In referring to the first, second and third gear sets in this description and in the claims, these sets may be counted "first" to "third" in any order in the drawings (i.e. left-to-right, right-to-left, etc.).

In another aspect of the present invention, each of the planetary gear sets may be of the single pinion type or of the double pinion type.

In yet another aspect of the present invention, a first input clutch and a second input clutch selectively connect the input shaft with other members of the transmission.

In another aspect of the invention, first and second torque transmitting mechanisms, such as synchronizers, selectively connect the first member and the second member of the first planetary gear set, respectively, with the first input clutch.

In another aspect of the invention, third, fourth and fifth torque transmitting mechanisms, such as synchronizers, selectively connect the first, second and third members of the first planetary gear set, respectively, with the first member of the second planetary gear set and the output shaft.

In yet another aspect of the present invention, the second member of the second planetary gear set is continuously connected with the second input clutch.

In another aspect of the invention, sixth and seventh torque transmitting mechanisms, such as synchronizers, selectively connect members of the second planetary gear set with members of the third planetary gear set.

In still a further aspect of the invention, eighth and ninth torque transmitting mechanisms, such as braking synchronizers, selectively connect members of the first planetary gear set with a stationary member (transmission housing).

In still a further aspect of the invention, tenth and eleventh torque transmitting mechanisms, such as braking synchronizers, selectively connect members of the third planetary gear set with the stationary member.

In yet another aspect of the present invention, a member of a second planetary gear set is continuously connected with a member of the third planetary gear set through a first interconnecting member.

In accordance with a further aspect of the invention, the input clutches and torque transmitting mechanisms are selectively engaged in combinations of at least three to provide at least six forward speed ratios and a reverse speed ratio.

In accordance with a further aspect of the invention, the first input clutch is applied for odd number speed ranges, and the second input clutch is applied for even number speed ranges, or vice versa.

In another aspect of the invention, the first input clutch and the second input clutch are interchanged (i.e. alternately engaged) to shift from odd number speed range to even number speed range, or vice versa.

In accordance with a further aspect of the invention, each selected torque transmitting mechanism for a new speed ratio is engaged prior to shifting of the input clutches to achieve shifts without torque interruptions.

In accordance with a further aspect of the invention, at least one pair of synchronizers is executed as a double synchronizer to reduce cost and package size.

In accordance with a further aspect of the invention, the first input clutch is eliminated and the first and second torque transmitting mechanisms are used as input clutches to further reduce content.

In accordance with a further aspect of the invention, at least one of the torque transmitting mechanisms can be eliminated to realize five forward speed ratios and a reverse speed ratio.

The above objects, features, advantages, and other objects, features, and advantages of the present invention are readily apparent from the following detailed description of the best modes for carrying out the invention when taken in connection with the accompanying drawings.

BRIEF DESCRIPTION OF THE DRAWINGS

FIG. 1a is a schematic representation of a powertrain including a planetary transmission incorporating a family member of the present invention;

FIG. 1b is a truth table and chart depicting some of the operating characteristics of the powertrain shown in FIG. 1a;

FIG. 2a is a schematic representation of a powertrain having a planetary transmission incorporating another family member of the present invention;

FIG. 2b is a truth table and chart depicting some of the operating characteristics of the powertrain shown in FIG. 2a;

FIG. 3a is a schematic representation of a powertrain having a planetary transmission incorporating another family member of the present invention;

FIG. 3b is a truth table and chart depicting some of the operating characteristics of the powertrain shown in FIG. 3a;

FIG. 4a is a schematic representation of a powertrain having a planetary transmission incorporating another family member of the present invention;

FIG. 4b is a truth table and chart depicting some of the operating characteristics of the powertrain shown in FIG. 4a;

FIG. 5a is a schematic representation of a powertrain having a planetary transmission incorporating another family member of the present invention;

FIG. 5b is a truth table and chart depicting some of the operating characteristics of the powertrain shown in FIG. 5a;

FIG. 6a is a schematic representation of a powertrain having a planetary transmission incorporating another family member of the present invention;

FIG. 6b is a truth table and chart depicting some of the operating characteristics of the powertrain shown in FIG. 6a;

FIG. 7a is a schematic representation of a powertrain having a planetary transmission incorporating another family member of the present invention;

FIG. 7b is a truth table and chart depicting some of the operating characteristics of the powertrain shown in FIG. 7a;

FIG. 8a is a schematic representation of a powertrain having a planetary transmission incorporating another family member of the present invention;

FIG. 8b is a truth table and chart depicting some of the operating characteristics of the powertrain shown in FIG. 8a;

FIG. 9a is a schematic representation of a powertrain having a planetary transmission incorporating another family member of the present invention;

FIG. 9b is a truth table and chart depicting some of the operating characteristics of the powertrain shown in FIG. 9a;

FIG. 10a is a schematic representation of a powertrain having a planetary transmission incorporating another family member of the present invention;

FIG. 10b is a truth table and chart depicting some of the operating characteristics of the powertrain shown in FIG. 10a;

FIG. 11a is a schematic representation of a powertrain having a planetary transmission incorporating another family member of the present invention;

FIG. 11b is a truth table and chart depicting some of the operating characteristics of the powertrain shown in FIG. 11a.

FIG. 12a is a schematic representation of a powertrain having a planetary transmission incorporating another family member of the present invention; and FIG. 12b is a truth table and chart depicting some of the operating characteristics of the powertrain shown in FIG. 12a.

DESCRIPTION OF THE PREFERRED EMBODIMENTS

Figures 1A, 1B:
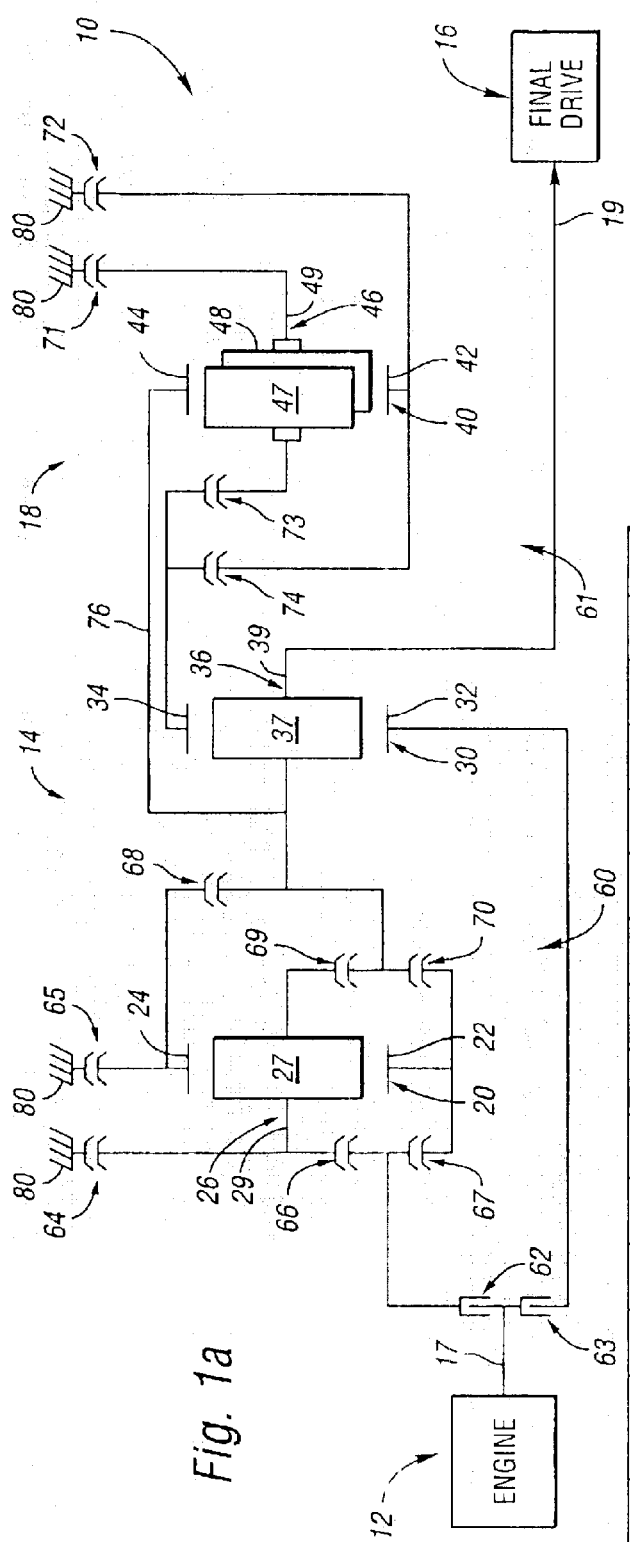

Referring to the drawings, wherein like characters represent the same or corresponding parts throughout the several views, there is shown in FIG. 1a a powertrain 10 having a conventional engine 12, a planetary transmission 14, and a conventional final drive mechanism 16.

The planetary transmission 14 includes an input shaft 17 continuously connected with the engine 12, a planetary gear arrangement 18, and an output shaft 19 continuously connected with the final drive mechanism 16. The planetary gear arrangement 18 includes three planetary gear sets 20, 30 and 40.

The planetary gear set 20 includes a sun gear member 22, a ring gear member 24, and a planet carrier assembly member 26. The planet carrier assembly member 26 includes a plurality of pinion gears 27 rotatably mounted on a carrier member 29 and disposed in meshing relationship with both the sun gear member 22 and the ring gear member 24.

The planetary gear set 30 includes a sun gear member 32, a ring gear member 34, and a planet carrier assembly member 36. The planet carrier assembly member 36 includes a plurality of pinion gears 37 rotatably mounted on a carrier member 39 and disposed in meshing relationship with both the sun gear member 32 and the ring gear member 34.

The planetary gear set 40 includes a sun gear member 42, a ring gear member 44, and a planet carrier assembly member 46. The planet carrier assembly member 46 includes a plurality of intermeshing pinion gears 47, 48 rotatably mounted on a carrier member 49 and disposed in meshing relationship with the ring gear member 44 and the sun gear member 42, respectively.

As a result of the dual clutch arrangement of the invention, the three planetary gear sets 20, 30 and 40 are divided into first and second transmission subsets 60, 61 which are alternatively engaged to provide odd number and even number speed ranges, respectively. Transmission subset 60 includes planetary gear set 20 and transmission subset 61 includes planetary gear sets 30 and 40. The output shaft 19 is continuously connected with a member of transmission subset 61.

As mentioned above, the first and second input clutches 62, 63 are alternatively engaged for transmitting power from the input shaft 17 to transmission subset 60 or transmission subset 61. The first and second input clutches 62, 63 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All gear speeds are preselected within the transmission subsets 60, 61 prior to engaging the respective input clutches 62, 63. The preselection is achieved by means of electronically controlled synchronizers. As shown, the planetary gear arrangement includes eleven torque transmitting mechanisms 64, 65, 66, 67, 68, 69, 70, 71, 72, 73 and 74. The torque transmitting mechanisms 64, 65, 71 and 72 comprise braking synchronizers (brakes) which connect gears to the transmission housing 80, and the torque transmitting mechanisms 66, 67, 68, 69, 70, 73 and 74 comprise rotating synchronizers.

The braking synchronizers and rotating synchronizers are referred to in the claims as follows: first and second torque transmitting mechanisms 66, 67; third, fourth and fifth torque transmitting mechanisms 68, 69, 70; sixth and seventh torque transmitting mechanisms 73, 74; eighth and ninth torque transmitting mechanisms 64, 65; and tenth and eleventh torque transmitting mechanisms 71, 72. Other family members are referred to similarly in the claims (i.e., synchronizers generally from left to right in Figures, and then braking synchronizers generally from left to right in Figures).

By way of example, synchronizers which may be implemented as the rotating and/or braking synchronizers referenced herein are shown in the following patents, each of which are incorporated by reference in their entirety: U.S. Pat. Nos. 5,651,435; 5,975,263; 5,560,461; 5,641,045; 5,497,867; 6,354,416.

Accordingly, the input shaft 17 is alternately connected with the first and second transmission subsets 60, 61 (i.e. through the clutch 62 to the synchronizers 66 and 67 and through the clutch 63 to the sun gear member 32). The planet carrier assembly member 36 is continuously connected with the ring gear member 44 through the interconnecting member 76.

The planet carrier assembly member 26 is selectively connectable with the transmission housing 80 through the braking synchronizer 64. The ring gear member 24 is selectively connectable with the transmission housing 80 through the braking synchronizer 65. The planet carrier assembly member 26 is selectively connectable with the input clutch 62 through the synchronizer 66. The sun gear member 22 is selectively connectable with the input clutch 62 through the synchronizer 67. The ring gear member 24 is selectively connectable with the planet carrier assembly member 36 through the synchronizer 68. The planet carrier assembly member 26 is selectively connectable with the planet carrier assembly member 36 through the synchronizer 69. The sun gear member 22 is selectively connectable with the planet carrier assembly member 36 through the synchronizer 70. The planet carrier assembly member 46 is selectively connectable with the transmission housing 80 through the braking synchronizer 71. The sun gear member 42 is selectively connectable with the transmission housing 80 through the braking synchronizer 72. The ring gear member 34 is selectively connectable with the planet carrier assembly member 46 through the synchronizer 73. The ring gear member 34 is selectively connectable with the sun gear member 42 through the synchronizer 74.

As shown in FIG. 1b, and in particular the truth table disclosed therein, the input clutches and torque transmitting mechanisms are selectively engaged in combinations of at least three to provide six forward speed ratios and a reverse speed ratio.

The reverse speed ratio is established with the engagement of the input clutch 62, the braking synchronizer 64 and the synchronizers 67, 68. The input clutch 62 and the synchronizer 67 connect the sun gear member 22 to the input shaft 17. The braking synchronizer 64 connects the planet carrier assembly member 26 to the transmission housing 80. The synchronizer 68 connects the ring gear member 24 to the planet carrier assembly member 36. The sun gear member 22 rotates at the same speed as the input shaft 17. The planet carrier assembly member 26 does not rotate. The ring gear member 24 and the planet carrier assembly member 36 rotate at the same speed as the output shaft 19. The ring gear member 24, and therefore the output shaft 19, rotates at a speed determined from the speed of the sun gear member 22 and the ring gear/sun gear tooth ratio of the planetary gear set 20. The numerical value of the reverse speed ratio is determined utilizing the ring gear/sun gear tooth ratio of the planetary gear set 20.

The first forward speed ratio is established with the engagement of the input clutch 62, the braking synchronizer 65 and the synchronizers 67, 69. The input clutch 62 and the synchronizer 67 connect the sun gear member 22 to the input shaft 17. The braking synchronizer 65 connects the ring gear member 24 to the transmission housing 80. The synchronizer 69 connects the planet carrier assembly member 26 to the planet carrier assembly member 36. The sun gear member 22 rotates at the same speed as the input shaft 17. The planet carrier assembly member 26 and the planet carrier assembly member 36 rotate at the same speed as the output shaft 19. The ring gear member 24 does not rotate. The planet carrier assembly member 26, and therefore the output shaft 19, rotates at a speed determined from the speed of the sun gear member 22 and the ring gear/sun gear tooth ratio of the planetary gear set 20. The numerical value of the first forward speed ratio is determined utilizing the ring gear/sun gear tooth ratio of the planetary gear set 20.

The second forward speed ratio is established with the engagement of the input clutch 63, the braking synchronizer 71 and the synchronizer 73. The input clutch 63 connects the sun gear member 32 to the input shaft 17. The braking synchronizer 71 connects the planet carrier assembly member 46 to the transmission housing 80. The synchronizer 73 connects the ring gear member 34 to the planet carrier assembly member 46. The sun gear member 32 rotates at the same speed as the input shaft 17. The planet carrier assembly member 36 and the ring gear member 44 rotate at the same speed as the output shaft 19. The ring gear member 34 and the planet carrier assembly member 46 do not rotate. The planet carrier assembly member 36, and therefore the output shaft 19, rotates at a speed determined from the speed of the sun gear member 32 and the ring gear/sun gear tooth ratio of the planetary gear set 30. The numerical value of the second forward speed ratio is determined utilizing the ring gear/sun gear tooth ratio of the planetary gear set 30.

The third forward speed ratio is established with the engagement of the input clutch 62, the braking synchronizer 64 and the synchronizers 67, 70. In this configuration, the input shaft 17 is directly connected to the output shaft 19. The numerical value of the third forward speed ratio is 1.

The fourth forward speed ratio is established with the engagement of the input clutch 63, the braking synchronizer 71 and the synchronizer 74. The input clutch 63 connects the sun gear member 32 to the input shaft 17. The braking synchronizer 71 connects the planet carrier assembly member 46 to the transmission housing 80. The synchronizer 74 connects the ring gear member 34 to the sun gear member 42. The sun gear member 32 rotates at the same speed as the input shaft 17. The planet carrier assembly member 36 and the ring gear member 44 rotate at the same speed as the output shaft 19. The ring gear member 34 rotates at the same speed as the sun gear member 42. The planet carrier assembly member 36, and therefore the output shaft 19, rotates at a speed determined from the speed of the ring gear member 34, the speed of the sun gear member 32 and the ring gear/sun gear tooth ratio of the planetary gear set 30. The planet carrier assembly member 46 does not rotate. The ring gear member 44 rotates at a speed determined from the speed of the sun gear member 42 and the ring gear/sun gear tooth ratio of the planetary gear set 40. The numerical value of the fourth forward speed ratio is determined utilizing the ring gear/sun gear tooth ratios of the planetary gear set 30, 40.

The fifth forward speed ratio is established with the engagement of the input clutch 62, the braking synchronizer 65 and the synchronizers 66, 70. The input clutch 62 and the synchronizer 66 connect the planet carrier assembly member 26 to the input shaft 17. The braking synchronizer 65 connects the ring gear member 24 to the transmission housing 80. The synchronizer 70 connects the sun gear member 22 to the planet carrier assembly member 36. The sun gear member 22 and the planet carrier assembly member 36 rotate at the same speed as the output shaft 19. The planet carrier assembly member 26 rotates at the same speed as the input shaft 17. The ring gear member 24 does not rotate. The sun gear member 22, and therefore the output shaft 19, rotates at a speed determined from the speed of the planet carrier assembly member 26 and the ring gear/sun gear tooth ratio of the planetary gear set 20. The numerical value of the fifth forward speed ratio is determined utilizing the ring gear/sun gear tooth ratio of the planetary gear set 20.

The sixth forward speed ratio is established with the engagement of the input clutch 63, the braking synchronizer 72 and the synchronizer 73. The input clutch 63 connects the sun gear member 32 to the input shaft 17. The braking synchronizer 72 connects the sun gear member 42 to the transmission housing 80. The synchronizer 73 connects the ring gear member 34 to the planet carrier assembly member 46. The sun gear member 32 rotates at the same speed as the input shaft 17. The planet carrier assembly member 36 and the ring gear member 44 rotate at the same speed as the output shaft 19. The ring gear member 34 rotates at the same speed as the planet carrier assembly member 46. The planet carrier assembly member 36, and therefore the output shaft 19, rotates at a speed determined from the speed of the ring gear member 34, the speed of the sun gear member 32 and the ring gear/sun gear tooth ratio of the planetary gear set 30. The sun gear member 42 does not rotate. The ring gear member 44 rotates at a speed determined from the speed of the planet carrier assembly member 46 and the ring gear/sun gear tooth ratio of the planetary gear set 40. The numerical value of the sixth forward speed ratio is determined utilizing the ring gear/sun gear tooth ratios of the planetary gear sets 30, 40.

As set forth above, the engagement schedule for the torque transmitting mechanisms is shown in the truth table of FIG. 1b. This truth table also provides an example of speed ratios that are available utilizing the ring gear/sun gear tooth ratios given by way of example in FIG. 1b. The R1/S1 value is the tooth ratio of the planetary gear set 20; the R2/S2 value is the tooth ratio of the planetary gear set 30; and the R3/S3 value is the tooth ratio of the planetary gear set 40. Also, the chart of FIG. 1b describes the ratio steps that are attained utilizing the sample of tooth ratios given. For example, the step ratio between first and second forward speed ratios is 1.68, while the step ratio between the reverse and first forward ratio is −0.60.

FIG. 2a shows a powertrain 110 having a conventional engine 12, a planetary transmission 114, and a conventional final drive mechanism 16. The planetary transmission 114 includes an input shaft 17 connected with the engine 12, a planetary gear arrangement 118, and an output shaft 19 connected with the final drive mechanism 16. The planetary gear arrangement 118 includes three planetary gear sets 120, 130 and 140.

The planetary gear set 120 includes a sun gear member 122, a ring gear member 124, and a planet carrier assembly member 126. The planet carrier assembly member 126 includes a plurality of pinion gears 127 rotatably mounted on a carrier member 129 and disposed in meshing relationship with both the sun gear member 122 and the ring gear member 124.

The planetary gear set 130 includes a sun gear member 132, a ring gear member 134, and a planet carrier assembly member 136. The planet carrier assembly member 136 includes a plurality of intermeshing pinion gears 137, 138 rotatably mounted on a carrier member 139 and disposed in meshing relationship with the ring gear member 134 and the sun gear member 132, respectively.

The planetary gear set 140 includes a sun gear member 142, a ring gear member 144, and a planet carrier assembly member 146. The planet carrier assembly member 146 includes a plurality of intermeshing pinion gears 147, 148 rotatably mounted on a carrier member 149 and disposed in meshing relationship with the ring gear member 144 and the sun gear member 142, respectively.

As a result of the dual clutch arrangement of the invention, the three planetary gear sets 120, 130 and 140 are divided into first and second transmission subsets 160, 161 which are alternatively engaged to provide odd number and even number speed ranges, respectively. Transmission subset 160 includes planetary gear set 120 and transmission subset 161 includes planetary gear sets 130 and 140. The output shaft 19 is continuously connected with a member of transmission subset 161.

As mentioned above, the first and second input clutches 162, 163 are alternatively engaged for transmitting power from the input shaft 17 to transmission subset 160 or transmission subset 161. The first and second input clutches 162, 163 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All gear speeds are preselected within the transmission subsets 160, 161 prior to engaging the respective input clutches 162, 163. The preselection is achieved by means of electronically controlled synchronizers. As shown, the planetary gear arrangement includes eleven torque transmitting mechanisms 164, 165, 166, 167, 168, 169, 170, 171, 172, 173 and 174. The torque transmitting mechanisms 164, 165, 171 and 172 comprise braking synchronizers (brakes) which connect gears to the transmission housing 180, and the torque transmitting mechanisms 166, 167, 168, 169, 170, 173 and 174 comprise rotating synchronizers.

Accordingly, the input shaft 17 is alternately connected with the first and second transmission subsets 160, 161 (i.e. through the clutch 162 to the synchronizers 166 and 167 and through the clutch 163 to the ring gear member 134). The sun gear member 132 is continuously connected with the sun gear member 142 through the interconnecting member 176.

The planet carrier assembly member 126 is selectively connectable with the transmission housing 180 through the braking synchronizer 164. The ring gear member 124 is selectively connectable with the transmission housing 180 through the braking synchronizer 165. The planet carrier assembly member 126 is selectively connectable with the input shaft 17 through the clutch 162 and the synchronizer 166. The sun gear member 122 is selectively connectable with the input shaft 17 through the clutch 162 and the synchronizer 167. The ring gear member 124 is selectively connectable with the planet carrier assembly member 136 through the synchronizer 168. The planet carrier assembly member 126 is selectively connectable with the planet carrier assembly member 136 through the synchronizer 169. The sun gear member 122 is selectively connectable with the planet carrier assembly member 136 through the synchronizer 170. The ring gear member 144 is selectively connectable with the transmission housing 180 through the braking synchronizer 171. The planet carrier assembly member 146 is selectively connectable with the transmission housing 180 through the braking synchronizer 172. The planet carrier assembly member 136 is selectively connectable with the ring gear member 144 through the synchronizer 173. The planet carrier assembly member 136 is selectively connectable with the planet carrier assembly member 146 through the synchronizer 174.

As shown in FIG. 2b, and in particular the truth table disclosed therein, the input clutches and torque transmitting mechanisms are selectively engaged in combinations of at least three to provide six forward speed ratios and a reverse speed ratio.

The reverse speed ratio is established with the engagement of the input clutch 162, the braking synchronizer 164 and the synchronizers 167, 168. The input clutch 162 and the synchronizer 167 connect the sun gear member 122 to the input shaft 17. The braking synchronizer 164 connects the planet carrier assembly member 126 to the transmission housing 180. The synchronizer 168 connects the ring gear member 124 to the planet carrier assembly member 136. The sun gear member 122 rotates at the same speed as the input shaft 17. The planet carrier assembly member 126 does not rotate. The ring gear member 124 and the planet carrier assembly member 136 rotate at the same speed as the output shaft 19. The ring gear member 124, and therefore the output shaft 19, rotates at a speed determined from the speed of the sun gear member 122 and the ring gear/sun gear tooth ratio of the planetary gear set 120. The numerical value of the reverse speed ratio is determined utilizing the ring gear/sun gear tooth ratio of the planetary gear set 120.

The first forward speed ratio is established with the engagement of the input clutch 162, the braking synchronizer 165 and the synchronizers 167, 169. The input clutch 162 and the synchronizer 167 connect the sun gear member 122 to the input shaft 17. The braking synchronizer 165 connects the ring gear member 124 to the transmission housing 180. The synchronizer 169 connects the planet carrier assembly member 126 to the planet carrier assembly member 136. The sun gear member 122 rotates at the same speed as the input shaft 17. The planet carrier assembly member 126 and the planet carrier assembly member 136 rotate at the same speed as the output shaft 19. The ring gear member 124 does not rotate. The planet carrier assembly member 126, and therefore the output shaft 19, rotates at a speed determined from the speed of the sun gear member 122 and the ring gear/sun gear tooth ratio of the planetary gear set 120. The numerical value of the first forward speed ratio is determined utilizing the ring gear/sun gear tooth ratio of the planetary gear set 120.

The second forward speed ratio is established with the engagement of the input clutch 163, the braking synchronizer 172 and the synchronizer 173. The input clutch 163 connects the ring gear member 134 to the input shaft 17. The braking synchronizer 172 connects the planet carrier assembly member 146 to the transmission housing 180. The synchronizer 173 connects the ring gear member 144 to the planet carrier assembly member 136. The sun gear member 132 rotates at the same speed as the sun gear member 142. The planet carrier assembly member 136 and the ring gear member 144 rotate at the same speed as the output shaft 19. The ring gear member 134 rotates at the same speed as the input shaft 17. The planet carrier assembly member 136, and therefore the output shaft 19, rotates at a speed determined from the speed of the ring gear member 134, the speed of the sun gear member 132 and the ring gear/sun gear tooth ratio of the planetary gear set 130. The planet carrier assembly member 146 does not rotate. The ring gear member 144 rotates at a speed determined from the speed of the sun gear member 142 and the ring gear/sun gear tooth ratio of the planetary gear set 140. The numerical value of the second forward speed ratio is determined utilizing the ring gear/sun gear tooth ratios of the planetary gear sets 130, 140.

The third forward speed ratio is established with the engagement of the input clutch 162, the braking synchronizer 164 and the synchronizers 167, 170. In this configuration, the input shaft 17 is directly connected to the output shaft 19. The numerical value of the third forward speed ratio is 1.

The fourth forward speed ratio is established with the engagement of the input clutch 163, and the braking synchronizers 171, 172. The input clutch 163 connects the ring gear member 134 to the input shaft 17. The braking synchronizer 171 connects the ring gear member 144 to the transmission housing 180. The braking synchronizer 172 connects the planet carrier assembly member 146 to the transmission housing 180. The sun gear member 132 and the planetary gear set 140 do not rotate. The planet carrier assembly member 136 rotates at the same speed as the output shaft 19. The ring gear member 134 rotates at the same speed as the input shaft 17. The planet carrier assembly member 136, and therefore the output shaft 19, rotates at a speed determined from the speed of the ring gear member 134 and the ring gear/sun gear tooth ratio of the planetary gear set 130. The numerical value of the fourth forward speed ratio is determined utilizing the ring gear/sun gear tooth ratio of the planetary gear set 130.

The fifth forward speed ratio is established with the engagement of the input clutch 162, the braking synchronizer 165, and the synchronizers 166, 170. The input clutch 162 and the synchronizer 166 connect the planet carrier assembly member 126 to the input shaft 17. The braking synchronizer 165 connects the ring gear member 124 to the transmission housing 180. The synchronizer 170 connects the sun gear member 122 to the planet carrier assembly member 136. The sun gear member 122 and the planet carrier assembly member 136 rotate at the same speed as the output shaft 19. The planet carrier assembly member 126 rotates at the same speed as the input shaft 17. The ring gear member 124 does not rotate. The sun gear member 122, and therefore the output shaft 19, rotates at a speed determined from the speed of the planet carrier assembly member 126 and the ring gear/sun gear tooth ratio of the planetary gear set 120. The numerical value of the fifth forward speed ratio is determined utilizing the ring gear/sun gear tooth ratio of the planetary gear set 120.

The sixth forward speed ratio is established with the engagement of the input clutch 163, the braking synchronizer 171 and the synchronizer 174. The input clutch 163 connects the ring gear member 134 to the input shaft 17. The braking synchronizer 171 connects the ring gear member 144 to the transmission housing 180. The synchronizer 174 connects the planet carrier assembly member 136 to the planet carrier assembly member 146. The sun gear member 132 rotates at the same speed as the sun gear member 142. The planet carrier assembly member 136 and the planet carrier assembly member 146 rotate at the same speed as the output shaft 19. The ring gear member 134 rotates at the same speed as the input shaft 17. The planet carrier assembly member 136, and therefore the output shaft 19, rotates at a speed determined from the speed of the ring gear member 134, the speed of the sun gear member 132 and the ring gear/sun gear tooth ratio of the planetary gear set 130. The ring gear member 144 does not rotate. The planet carrier assembly member 146 rotates at a speed determined from the speed of the sun gear member 142 and the ring gear/sun gear tooth ratio of the planetary gear set 140. The numerical value of the sixth forward speed ratio is determined utilizing the ring gear/sun gear tooth ratios of the planetary gear sets 130, 140.

As set forth above, the truth table of FIG. 2b describes the engagement sequence of the torque transmitting mechanisms utilized to provide a reverse drive ratio and six forward speed ratios. The truth table also provides an example of the ratios that can be attained with the family members shown in FIG. 2a utilizing the sample tooth ratios given in FIG. 2b. The R1/S1 value is the tooth ratio of the planetary gear set 120; the R2/S2 value is the tooth ratio of the planetary gear set 130; and the R3/S3 value is the tooth ratio of the planetary gear set 140. Also shown in FIG. 2b are the ratio steps between single step ratios in the forward direction as well as the reverse to first ratio step. For example, the first to second step ratio is 1.85.

Figures 3A, 3B:
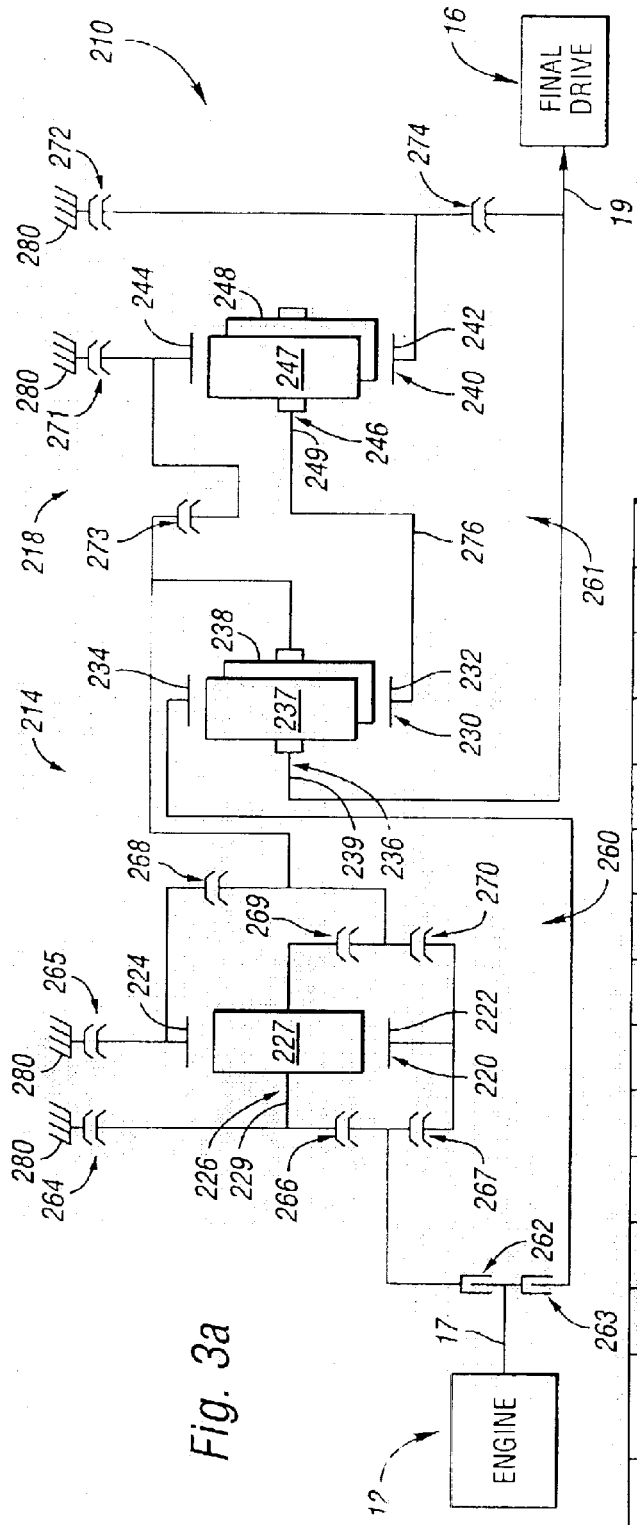

Turning the FIG. 3a, a powertrain 210 having a conventional engine 12, a planetary transmission 214, and conventional final drive mechanism 16 is shown.

The planetary transmission 214 includes an input shaft 17 continuously connected with the engine 12, a planetary gear arrangement 218, and an output shaft 19 continuously connected with the final drive mechanism 16. The planetary gear arrangement 218 includes three planetary gear sets 220, 230 and 240.

The planetary gear set 220 includes a sun gear member 222, a ring gear member 224, and a planet carrier assembly member 226. The planet carrier assembly member 226 includes a plurality of pinion gears 227 rotatably mounted on a carrier member 229 and disposed in meshing relationship with both the sun gear member 222 and the ring gear member 224.

The planetary gear set 230 includes a sun gear member 232, a ring gear member 234, and a planet carrier assembly member 236. The planet carrier assembly member 236 includes a plurality of intermeshing pinion gears 237, 238 rotatably mounted on a carrier member 239 and disposed in meshing relationship with the ring gear member 234 and the sun gear member 232, respectively.

The planetary gear set 240 includes a sun gear member 242, a ring gear member 244, and a planet carrier assembly member 246. The planet carrier assembly member 246 includes a plurality of intermeshing pinion gears 247, 248 rotatably mounted on a carrier member 249 and disposed in meshing relationship with the ring gear member 244 and the sun gear member 242, respectively.

As a result of the dual clutch arrangement of the invention, the three planetary gear sets 220, 230 and 240 are divided into first and second transmission subsets 260, 261 which are alternatively engaged to provide odd number and even number speed ranges, respectively. Transmission subset 260 includes planetary gear set 220, and transmission subset 261 includes planetary gear sets 230 and 240. The output shaft 19 is continuously connected with a member of transmission subset 261.

As mentioned above, the first and second input clutches 262, 263 are alternatively engaged for transmitting power from the input shaft 17 to transmission subset 260 or transmission subset 261. The first and second input clutches 262, 263 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All gear speeds are preselected within the transmission subsets 260, 261 prior to engaging the respective input clutches 262, 263. The preselection is achieved by means of electronically controlled synchronizers. As shown, the planetary gear arrangement includes eleven torque transmitting mechanisms 264, 265, 266, 267, 268, 269, 270, 271, 272, 273 and 274. The torque transmitting mechanisms 264, 265, 271 and 272 comprise braking synchronizers (brakes) which connect gears to the transmission housing 280, and the torque transmitting mechanisms 266, 267, 268, 269, 270, 273 and 274 comprise rotating synchronizers.

Accordingly, the input shaft 17 is alternately connected with the first and second transmission subsets 260, 261 (i.e. through the clutch 262 to the synchronizers 266 and 267 and through the clutch 263 to the ring gear member 234). The sun gear member 232 is continuously connected with the planet carrier assembly member 246 through the interconnecting member 276.

The planet carrier assembly member 226 is selectively connectable with the transmission housing 280 through the braking synchronizer 264. The ring gear member 224 is selectively connectable with the transmission housing 280 through the braking synchronizer 265. The planet carrier assembly member 226 is selectively connectable with the input shaft 17 through the input clutch 262 and the synchronizer 266. The sun gear member 222 is selectively connectable with the input shaft 17 through the synchronizer 267 and the input clutch 262. The ring gear member 224 is selectively connectable with the planet carrier assembly member 236 through the synchronizer 268. The planet carrier assembly member 226 is selectively connectable with the planet carrier assembly member 236 through the synchronizer 269. The sun gear member 222 is selectively connectable with the planet carrier assembly member 236 through the synchronizer 270. The ring gear member 244 is selectively connectable with the transmission housing 280 through the braking synchronizer 271. The sun gear member 242 is selectively connectable with the transmission housing 280 through the braking synchronizer 272. The planet carrier assembly member 236 is selectively connectable with the ring gear member 244 through the synchronizer 273. The planet carrier assembly member 236 is selectively connectable with the sun gear member 242 through the synchronizer 274.

As shown in FIG. 3b, and in particular the truth table disclosed therein, the input clutches and torque transmitting mechanisms are selectively engaged in combinations of at least three to provide six forward speed ratio and a reverse speed ratio.

The reverse speed ratio is established with the engagement of the input clutch 262, the braking synchronizer 264 and the synchronizer 267, 268. The input clutch 262 and the synchronizer 267 connect the sun gear member 222 to the input shaft 17. The braking synchronizer 264 connects the planet carrier assembly member 226 to the transmission housing 280. The synchronizer 268 connects the ring gear member 224 to the planet carrier assembly member 236. The sun gear member 222 rotates at the same speed as the input shaft 17. The planet carrier assembly member 226 does not rotate. The ring gear member 224 and the planet carrier assembly member 236 rotate at the same speed as the output shaft 19. The ring gear member 224, and therefore the output shaft 19, rotates at a speed determined from the speed of the sun gear member 222 and the ring gear/sun gear tooth ratio of the planetary gear set 220. The numerical value of the reverse speed ratio is determined utilizing the ring gear/sun gear tooth ratio of the planetary gear set 220.

The first forward speed ratio is established with the engagement of the input clutch 262, the braking synchronizer 265 and the synchronizer 267, 269. The input clutch 262 and the synchronizer 267 connect the sun gear member 222 to the input shaft 17. The braking synchronizer 265 connects the ring gear member 224 to the transmission housing 280. The synchronizer 269 connects the planet carrier assembly member 226 to the planet carrier assembly member 236. The sun gear member 222 rotates at the same speed as the input shaft 17. The planet carrier assembly member 226 and the planet carrier assembly member 236 rotate at the same speed as the output shaft 19. The ring gear member 224 does not rotate. The sun gear member 226, and therefore the output shaft 19, rotates at a speed determined from the speed of the sun gear member 222 and the ring gear/sun gear tooth ratio of the planetary gear set 220. The numerical value of the first forward speed ratio is determined utilizing the ring gear/sun gear tooth ratio of the planetary gear set 220.

The second forward speed ratio is established with the engagement of the input clutch 263, the braking synchronizer 272 and the synchronizer 273. The input clutch 263 connects the ring gear member 234 to the input shaft 17. The braking synchronizer 272 connects the sun gear member 242 to the transmission housing 280. The synchronizer 273 connects the planet carrier assembly member 236 to the ring gear member 244. The sun gear member 232 rotates at the same speed as the planet carrier assembly member 246. The planet carrier assembly member 236 and the ring gear member 244 rotate at the same speed as the output shaft 19. The ring gear member 234 rotates at the same speed as the input shaft 17. The planet carrier assembly member 236, and therefore the output shaft 19, rotates at a speed determined from the speed of the ring gear member 234, the speed of the sun gear member 232 and the ring gear/sun gear tooth ratio of the planetary gear set 230. The sun gear member 242 does not rotate. The ring gear member 244 rotates at a speed determined from the speed of the planet carrier assembly member 246 and the ring gear/sun gear tooth ratio of the planetary gear set 240. The numerical value of the second forward speed ratio is determined utilizing the ring gear/sun gear tooth ratios of the planetary gear sets 230, 240.

The third forward speed ratio is established with the engagement of the input clutch 262, the braking synchronizer 264 and the synchronizer 267, 270. In this configuration, the input shaft 17 is directly connected to the output shaft 19. The numerical value of the third forward speed ratio is 1.

The fourth forward speed ratio is established with the engagement of the input clutch 263 and the braking synchronizers 271, 272. The input clutch 263 connects the ring gear member 234 to the input shaft 17. The braking synchronizer 271 connects the ring gear member 244 to the transmission housing 280. The braking synchronizer 272 connects the sun gear member 242 to the transmission housing 280. The sun gear member 232 and the planetary gear set 240 do not rotate. The planet carrier assembly member 236 rotates at the same speed as the output shaft 19. The ring gear member 234 rotates at the same speed as the input shaft 17. The planet carrier assembly member 236, and therefore the output shaft 19, rotates at a speed determined from the speed of the ring gear member 234 and the ring gear/sun gear tooth ratio of the planetary gear set 230. The numerical value of the fourth forward speed ratio is determined utilizing the ring gear/sun gear tooth ratio of the planetary gear set 230.

The fifth forward speed ratio is established with the engagement of the input clutch 262, the braking synchronizer 265 and the synchronizers 266, 270. The input clutch 262 and the synchronizer 266 connect the planet carrier assembly member 226 to the input shaft 17. The braking synchronizer 265 connects the ring gear member 224 to the transmission housing 280. The synchronizer 270 connects the sun gear member 222 to the planet carrier assembly member 236. The sun gear member 222 and the planet carrier assembly member 236 rotate at the same speed as the output shaft 19. The planet carrier assembly member 226 rotates at the same speed as the input shaft 17. The ring gear member 224 does not rotate. The sun gear member 222, and therefore the output shaft 19, rotates at a speed determined from the speed of the planet carrier assembly member 226 and the ring gear/sun gear tooth ratio of the planetary gear set 220. The numerical value of the fifth forward speed ratio is determined utilizing the ring gear/sun gear tooth ratio of the planetary gear set 220.

The sixth forward speed ratio is established with the engagement of the input clutch 263, the braking synchronizer 271 and the synchronizer 274. The input clutch 263 connects the ring gear member 234 to the input shaft 17. The braking synchronizer 271 connects the ring gear member 244 to the transmission housing 280. The synchronizer 274 connects the planet carrier assembly member 236 to the sun gear member 242. The sun gear member 232 rotates at the same speed as the planet carrier assembly member 246. The planet carrier assembly member 236 and the sun gear member 242 rotate at the same speed as the output shaft 19. The ring gear member 234 rotates at the same speed as the input shaft 17. The planet carrier assembly member 236, and therefore the output shaft 19, rotates at a speed determined from the speed of the ring gear member 234, the speed of the sun gear member 232 and the ring gear/sun gear tooth ratio of the planetary gear set 230. The ring gear member 244 does not rotate. The planet carrier assembly member 246 rotates at a speed determined from the speed of the sun gear member 242 and the ring gear/sun gear tooth ratio of the planetary gear set 240. The numerical value of the sixth forward speed ratio is determined utilizing the ring gear/sun gear tooth ratios of the planetary gear sets 230, 240.

As previously set forth, the truth table of FIG. 3b describes the combinations of engagements utilized for six forward speed ratios and one reverse speed ratio. The truth table also provides an example of speed ratios that are available with the family member described above. These examples of speed ratios are determined the tooth ratios given in FIG. 3b. The R1/S1 value is the tooth ratio of the planetary gear set 220; the R2/S2 value is the tooth ratio of the planetary gear set 230; and the R3/S3 value is the tooth ratio of the planetary gear set 240. Also depicted in FIG. 3b is a chart representing the ratio steps between adjacent forward speed ratios and the reverse speed ratio. For example, the first to second ratio interchange has a step of 1.85.

A powertrain 310, shown in FIG. 4a, includes the engine 12, a planetary transmission 314, and the final drive mechanism 16. The planetary transmission 314 includes an input shaft 17 continuously connected with the engine 12, a planetary gear arrangement 318, and an output shaft 19 continuously connected with the final drive mechanism 16. The planetary gear arrangement 318 includes three planetary gear sets 320, 330 and 340.

The planetary gear set 320 includes a sun gear member 322, a ring gear member 324, and a planet carrier assembly member 326. The planet carrier assembly member 326 includes a plurality of intermeshing pinion gears 327, 328 rotatably mounted on a carrier member 329 and disposed in meshing relationship with the ring gear member 324 and the sun gear member 322, respectively.

The planetary gear set 330 includes a sun gear member 332, a ring gear member 334, and a planet carrier assembly member 336. The planet carrier assembly member 336 includes a plurality of intermeshing pinion gears 337, 338 rotatably mounted on a carrier member 339 and disposed in meshing relationship with the ring gear member 334 and the sun gear member 332, respectively.

The planetary gear set 340 includes a sun gear member 342, a ring gear member 344, and a planet carrier assembly member 346. The planet carrier assembly member 346 includes a plurality of pinion gears 347 rotatably mounted on a carrier member 349 and disposed in meshing relationship with both the sun gear member 342 and the ring gear member 344.

As a result of the dual clutch arrangement of the invention, the three planetary gear sets 320, 330 and 340 are divided into first and second transmission subsets 360, 361 which are alternatively engaged to provide odd number and even number speed ranges, respectively. Transmission subset 360 includes planetary gear set 320, and transmission subset 361 includes planetary gear sets 330 and 340. The output shaft 19 is continuously connected with a member of transmission subset 361.

As mentioned above, the first and second input clutches 362, 363 are alternatively engaged for transmitting power from the input shaft 17 to transmission subset 360 or transmission subset 361. The first and second input clutches 362, 363 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All gear speeds are preselected within the transmission subsets 360, 361 prior to engaging the respective input clutches 362, 363. The preselection is achieved by means of electronically controlled synchronizers. As shown, the planetary gear arrangement includes eleven torque transmitting mechanisms 364, 365, 366, 367, 368, 369, 370, 371, 372, 373 and 374. The torque transmitting mechanisms 364, 365, 371 and 372 comprise braking synchronizers (brakes) which connect gears to the transmission housing 380, and the torque transmitting mechanisms 366, 367, 368, 369, 370, 373 and 374 comprise rotating synchronizers.

Accordingly, the input shaft 17 is alternately connected with the first and second transmission subsets 360, 361 (i.e. through the clutch 362 to the synchronizers 366 and 367 and through the clutch 363 to the ring gear member 334). The sun gear member 332 is continuously connected with the sun gear member 342 through the interconnecting member 376.

The planet carrier assembly member 326 is selectively connectable with the transmission housing 380 through the braking synchronizer 364. The sun gear member 322 is selectively connectable with the transmission housing 380 through the braking synchronizer 365. The planet carrier assembly member 326 is selectively connectable with the input shaft 17 through the input clutch 362 and the synchronizer 366. The ring gear member 324 is selectively connectable with the input shaft 17 through the input clutch 362 and the synchronizer 367. The sun gear member 322 is selectively connectable with the planet carrier assembly member 336 through the synchronizer 368. The planet carrier assembly member 326 is selectively connectable with the planet carrier assembly member 336 through the synchronizer 369. The ring gear member 324 is selectively connectable with the planet carrier assembly member 336 through the synchronizer 370. The ring gear member 344 is selectively connectable with the transmission housing 380 through the braking synchronizer 371. The planet carrier assembly member 346 is selectively connectable with the transmission housing 380 through the braking synchronizer 372. The planet carrier assembly member 336 is selectively connectable with the ring gear member 344 through the synchronizer 373. The planet carrier assembly member 336 is selectively connectable with the planet carrier assembly member 346 through the synchronizer 374.

The truth tables given in FIGS. 4b, 5b, 6b, 7b, 8b, 9b, 10b, 11b and 12b show the engagement sequences for the torque transmitting mechanisms to provide at least five forward speed ratios and one reverse speed ratio. As shown and described above for the configurations in FIGS. 1a, 2a and 3a, those skilled in the art will understand from the respective truth tables how the speed ratios are established through the planetary gear sets identified in the written description.

The truth table shown in FIG. 4b describes the engagement combination and engagement sequence necessary to provide the reverse drive ratio and six forward speed ratios. A sample of the numerical values for the ratios is also provided in the truth table of FIG. 4b. These values are determined utilizing the ring gear/sun gear tooth ratios also given in FIG. 4b. The R1/S1 value is the tooth ratio for the planetary gear set 320; the R2/S2 value is the tooth ratio for the planetary gear set 330; and the R3/S3 value is the tooth ratio for the planetary gear set 340. Also given in FIG. 4b is a chart describing the step ratios between the adjacent forward speed ratios and the reverse to first forward speed ratio. For example, the first to second forward speed ratio step is 1.76.

Those skilled in the art will recognize that the numerical values of the reverse and first forward speed ratios are determined utilizing the ring gear/sun gear tooth ratios of the planetary gear sets 330, 340. The numerical values of the second, fourth and sixth forward speed ratios are determined utilizing the ring gear/sun gear tooth ratio of the planetary gear set 320. The numerical value of the third forward speed ratio is 1. The numerical value of the fifth forward speed ratio is determined utilizing the ring gear/sun gear tooth ratio of the planetary gear set 330.

Figures 5A, 5B:
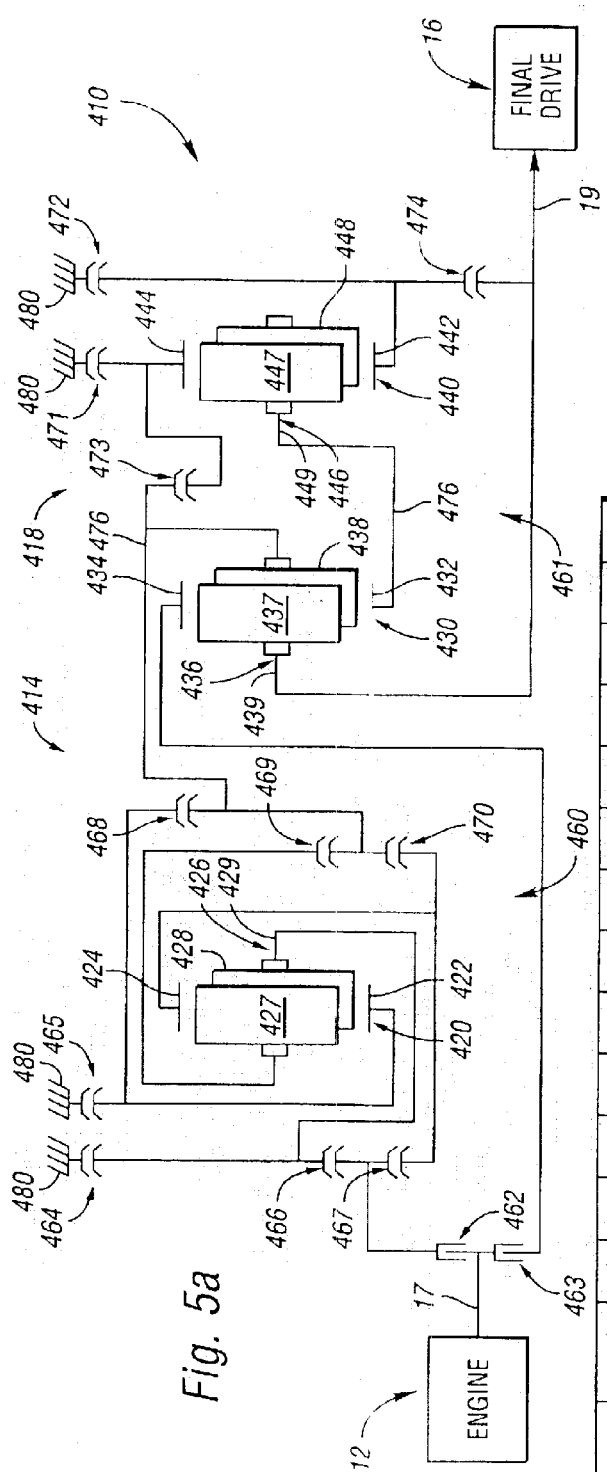

A powertrain 410 shown in FIG. 5a includes a conventional engine 12, a planetary transmission 414, and a conventional final drive mechanism 16. The planetary transmission 414 includes an input shaft 17 connected with the engine 12, a planetary gear arrangement 418, and an output shaft 19 continuously connected with the final drive mechanism 16. The planetary gear arrangement 418 includes three planetary gear sets 420, 430 and 440.

The planetary gear set 420 includes a sun gear member 422, a ring gear member 424, and a planet carrier assembly member 426. The planet carrier assembly member 426 includes a plurality of intermeshing pinion gears 427, 428 rotatably mounted on a carrier member 429 and disposed in meshing relationship with the ring gear member 424 and the sun gear member 422, respectively.

The planetary gear set 430 includes a sun gear member 432, a ring gear member 434, and a planet carrier assembly member 436. The planet carrier assembly member 436 includes a plurality of intermeshing pinion gears 437, 438 rotatably mounted on a carrier member 439 and disposed in meshing relationship with the ring gear member 434 and the sun gear member 432, respectively.

The planetary gear set 440 includes a sun gear member 442, a ring gear member 444, and a planet carrier assembly member 446. The planet carrier assembly member 446 includes a plurality of intermeshing pinion gears 447, 448 rotatably mounted on a carrier member 449 and disposed in meshing relationship with the ring gear member 444 and the sun gear member 442, respectively.

As a result of the dual clutch arrangement of the invention, the three planetary gear sets 420, 430 and 440 are divided into first and second transmission subsets 460, 461 which are alternatively engaged to provide odd number and even number speed ranges, respectively. Transmission subset 460 includes planetary gear set 420, and transmission subset 461 includes planetary gear sets 430 and 440. The output shaft 19 is continuously connected with a member of transmission subset 461.

As mentioned above, the first and second input clutches 462, 463 are alternatively engaged for transmitting power from the input shaft 17 to transmission subset 460 or transmission subset 461. The first and second input clutches 462, 463 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All gear speeds are preselected within the transmission subsets 460, 461 prior to engaging the respective input clutches 462, 463. The preselection is achieved by means of electronically controlled synchronizers. As shown, the planetary gear arrangement includes eleven torque transmitting mechanisms 464, 465, 466, 467, 468, 469, 470, 471, 472, 473 and 474. The torque transmitting mechanisms 464, 465, 471 and 472 comprise braking synchronizers (brakes) which connect gears to the transmission housing 480, and the torque transmitting mechanisms 466, 467, 468, 469, 470, 473 and 474 comprise rotating synchronizers.

Accordingly, the input shaft 17 is alternately connected with the first and second transmission subsets 460, 461 (i.e. through the clutch 462 to the synchronizers 466 and 467 and through the clutch 463 to the ring gear member 434). The sun gear member 432 is continuously connected with the planet carrier assembly member 446 through the interconnecting member 476.

The planet carrier assembly member 426 is selectively connectable with the transmission housing 480 through the braking synchronizer 464. The sun gear member 422 is selectively connectable with the transmission housing 480 through the braking synchronizer 465. The planet carrier assembly member 426 is selectively connectable with the input shaft 17 through the input clutch 462 and the synchronizer 466. The ring gear member 424 is selectively connectable with the input shaft 17 through the input clutch 462 and the synchronizer 467. The sun gear member 422 is selectively connectable with the planet carrier assembly member 436 through the synchronizer 468. The planet carrier assembly member 426 is selectively connectable with the planet carrier assembly member 436 through the synchronizer 469. The ring gear member 424 is selectively connectable with the planet carrier assembly member 436 through the synchronizer 470. The ring gear member 444 is selectively connectable with the transmission housing 480 through the braking synchronizer 471. The sun gear member 442 is selectively connectable with the transmission housing 480 through the braking synchronizer 472. The planet carrier assembly member 436 is selectively connectable with the ring gear member 444 through the synchronizer 473. The planet carrier assembly member 436 is selectively connectable with the sun gear member 442 through the synchronizer 474.

As shown in FIG. 5b, and in particular the truth table disclosed therein, the input clutches and torque transmitting mechanisms are selectively engaged in combinations of at least three to provide six forward speed ratios and a reverse speed ratio.

FIG. 5b also provides a chart of the ratio steps between adjacent forward ratios and between the reverse and first ratio. For example, the ratio step between the first and second forward ratios is 1.41. Those skilled in the art will recognize that the numerical values of the reverse and first forward speed ratios are determined utilizing the ring gear/sun gear tooth ratios of the planetary gear sets 430, 440. The numerical values of the second, fourth and sixth forward speed ratios are determined utilizing the ring gear/sun gear tooth ratio of the planetary gear set 420. The numerical value of the third forward speed ratio is 1. The numerical value of the fifth forward speed ratio is determined utilizing the ring gear/sun gear tooth ratio of the planetary gear set 430.

Figures 6A, 6B:
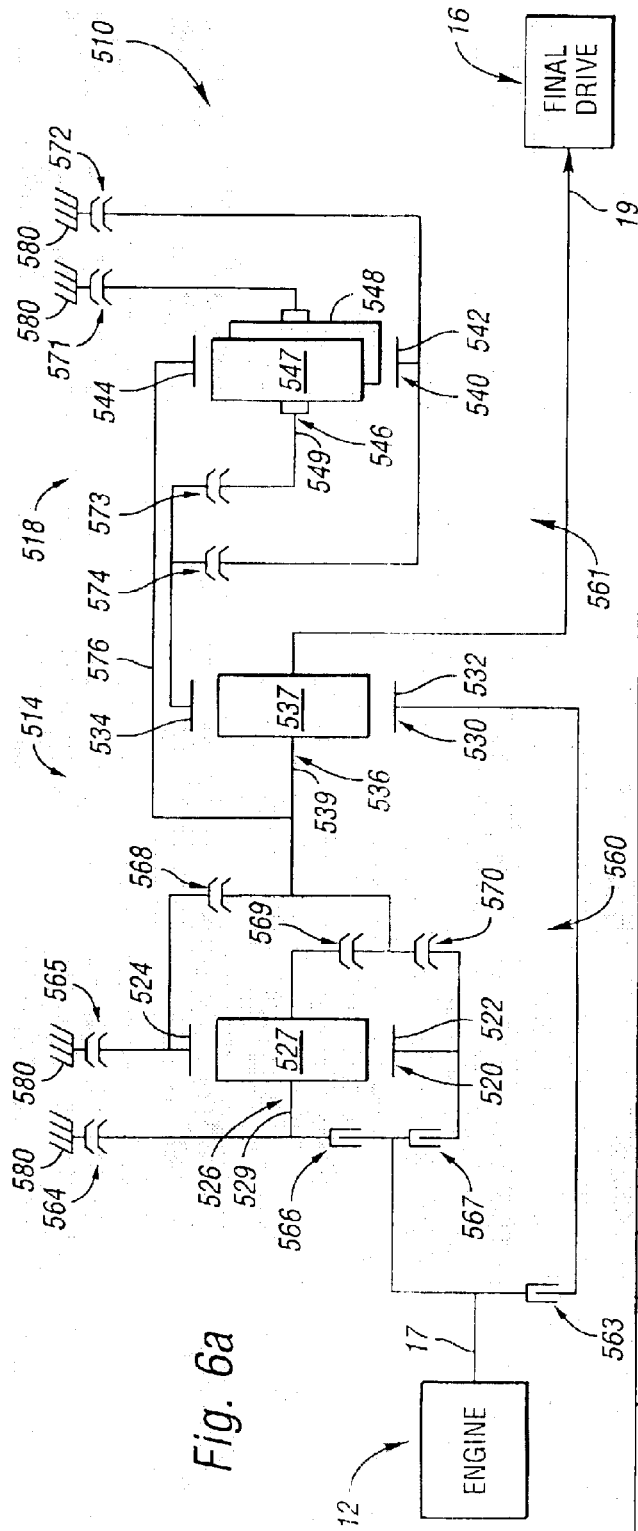

A powertrain 510, shown in FIG. 6a, includes a conventional engine 12, a powertrain 514, and a conventional final drive mechanism 16. The powertrain 514 includes an input shaft 17 connected with the engine 12, a planetary gear arrangement 518, and an output shaft 19 continuously connected with the final drive mechanism 16. The planetary gear arrangement 518 includes three planetary gear sets 520, 530 and 540.

The planetary gear set 520 includes a sun gear member 522, a ring gear member 524, and a planet carrier assembly member 526. The planet carrier assembly member 526 includes a plurality of pinion gears 527 rotatably mounted on a carrier member 529 and disposed in meshing relationship with both the sun gear member 522 and the ring gear member 524.

The planetary gear set 530 includes a sun gear member 532, a ring gear member 534, and a planet carrier assembly member 536. The planet carrier assembly member 536 includes a plurality of pinion gears 537 rotatably mounted on a carrier member 539 and disposed in meshing relationship with both the sun gear member 532 and the ring gear member 534.

The planetary gear set 540 includes a sun gear member 542, a ring gear member 544, and a planet carrier assembly member 546. The planet carrier assembly member 546 includes a plurality of intermeshing pinion gears 547, 548 rotatably mounted on a carrier member 549 and disposed in meshing relationship with the ring gear member 544 and the sun gear member 542, respectively.

As a result of the dual clutch arrangement of the invention, the three planetary gear sets 520, 530 and 540 are divided into first and second transmission subsets 560, 561 which are alternatively engaged to provide odd number and even number speed ranges, respectively. Transmission subset 560 includes planetary gear set 520, and transmission subset 561 includes planetary gear sets 530 and 540. The output shaft 19 is continuously connected with a member of transmission subset 561.

In this family member, which is a derivative of the family member shown in FIG. 1a, rather than having two input clutches and eleven synchronizers, three input clutch clutches and nine synchronizers are utilized to achieve reduced content. The first input clutch and first and second synchronizers in FIG. 1a are here operatively replaced by a first and second input clutch 566 and 567, and the second input clutch in FIG. 1a remains here as a third input clutch 563. The input clutches 563, 566 and 567 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All gear speeds are preselected within the transmission subsets 560, 561 prior to engaging the respective input clutch 563, 566, or 567. The preselection is achieved by means of electronically controlled synchronizers. As shown, the planetary gear arrangement includes nine torque transmitting mechanisms 564, 565, 568, 569, 570, 571, 572, 573 and 574. The torque transmitting mechanisms 564, 565, 571 and 572 comprise braking synchronizers (brakes) which connect gears to the transmission housing 580, and the torque transmitting mechanisms 568, 569, 570, 573 and 574 comprise rotating synchronizers.

Accordingly, the input shaft 17 is alternately connected with the first and second transmission subsets 560, 561 (i.e. through the clutch 566 to the planet carrier assembly member 526, through the clutch 567 to the sun gear member 522 and through the clutch 563 to the sun gear member 532). The planet carrier assembly member 536 is continuously connected with the ring gear member 544 through the interconnecting member 576.

The planet carrier assembly member 526 is selectively connectable with the transmission housing 580 through the braking synchronizer 564. The ring gear member 524 is selectively connectable with the transmission housing 580 through the braking synchronizer 565. The planet carrier assembly member 526 is selectively connectable with the input shaft 17 through the input clutch 566. The sun gear member 522 is selectively connectable with the input shaft 17 through the input clutch 567. The sun gear member 532 is selectively connectable with the input shaft 17 through the input clutch 563. The ring gear member 524 is selectively connectable with the planet carrier assembly member 536 through the synchronizer 568. The planet carrier assembly member 526 is selectively connectable with the planet carrier assembly member 536 through the synchronizer 569. The sun gear member 524 is selectively connectable with the planet carrier assembly member 536 through the synchronizer 570. The planet carrier assembly member 546 is selectively connectable with the transmission housing 580 through the braking synchronizer 571. The sun gear member 542 is selectively connectable with the transmission housing 580 through the braking synchronizer 572. The ring gear member 534 is selectively connectable with the planet carrier assembly member 546 through the synchronizer 573. The ring gear member 534 is selectively connectable with the sun gear member 542 through the synchronizer 574.

As shown in FIG. 6b, and in particular the truth table disclosed therein, the input clutch and torque transmitting mechanisms are selectively engaged in combinations of three to provide six forward speed ratios and a reverse speed ratio. The chart of FIG. 6b describes the ratio steps between adjacent forward speed ratios and the ratio step between the reverse and first forward speed ratio.

Those skilled in the art, upon reviewing the truth table and the schematic representation of FIG. 6a can determine that the numerical values of the reverse, first and fifth forward speed ratios are determined utilizing the ring gear/sun gear tooth ratio of the planetary gear set 520. The numerical value of the second forward speed ratio is determined utilizing the ring gear/sun gear tooth ratio of the planetary gear set 530. The numerical value of the third forward speed ratio is 1. The numerical values of the fourth and sixth forward speed ratios are determined utilizing the ring gear/sun gear tooth ratios of the planetary gear sets 530, 540.

The sample speed ratios given in the truth table are determined utilizing the tooth ratio values also given in FIG. 6b. R1/S1 value is the tooth ratio of the planetary gear set 520; the R2/S2 value is the tooth ratio of the planetary gear set 530; and the R3/S3 value is the tooth ratio of the planetary gear set 540.

Figures 7A, 7B:
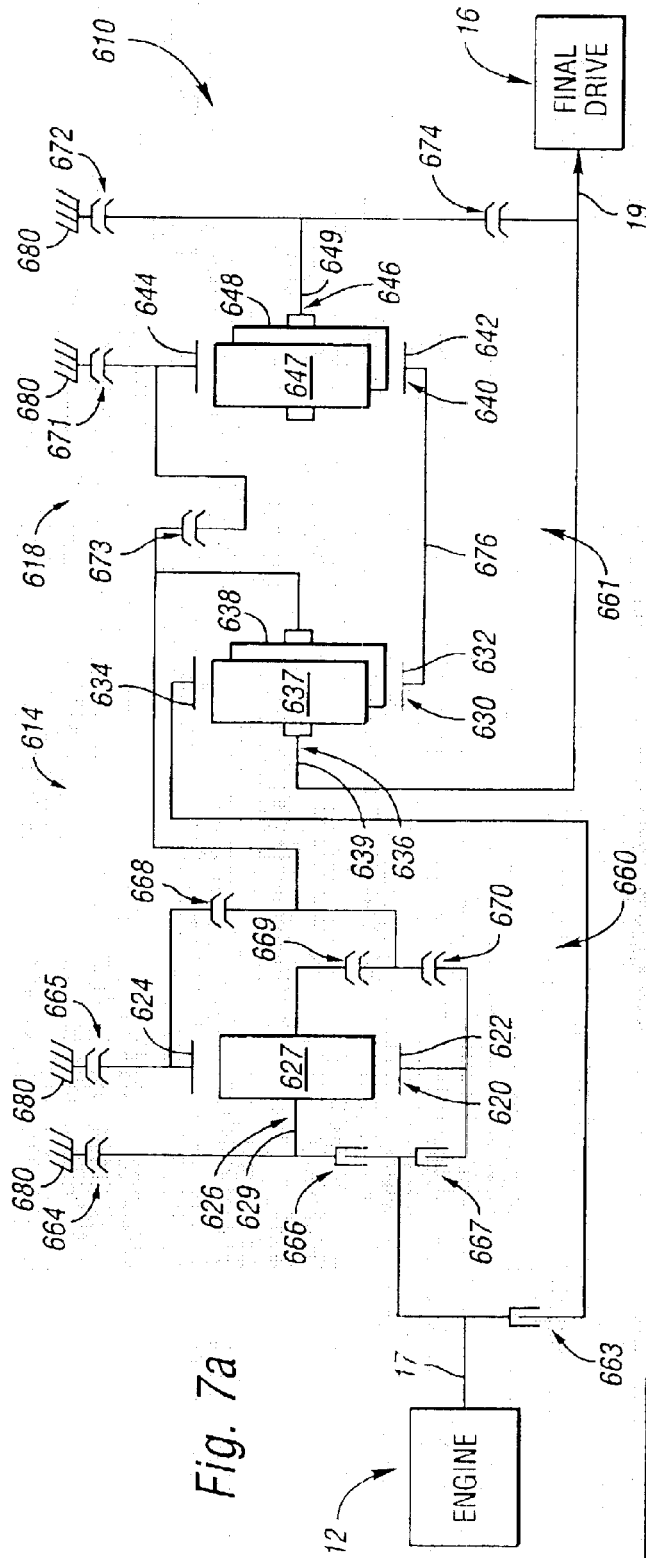

A powertrain 610, shown in FIG. 7a, has the engine and torque converter 12, a planetary transmission 614, and the final drive mechanism 16. The planetary transmission 614 includes the input shaft 17, a planetary gear arrangement 618, and the output shaft 19. The planetary gear arrangement 618 includes three planetary gear sets 620, 630 and 640.

The planetary gear set 620 includes a sun gear member 622, a ring gear member 624, and a planet carrier assembly member 626. The planet carrier assembly member 626 includes a plurality of pinion gears 627 rotatably mounted on a carrier member 629 and disposed in meshing relationship with both the sun gear member 622 and the ring gear member 624.

The planetary gear set 630 includes a sun gear member 632, a ring gear member 634, and a planet carrier assembly member 636. The planet carrier assembly member 636 includes a plurality of intermeshing pinion gears 637, 638 rotatably mounted on a carrier member 639 and disposed in meshing relationship with the ring gear member 634 and the sun gear member 632, respectively.

The planetary gear set 640 includes a sun gear member 642, a ring gear member 644, and a planet carrier assembly member 646. The planet carrier assembly member 646 includes a plurality of intermeshing pinion gears 647, 648 rotatably mounted on a carrier member 649 and disposed in meshing relationship with the ring gear member 644 and the sun gear member 642, respectively.

As a result of the dual clutch arrangement of the invention, the four planetary gear sets 620, 630, 640 and 650 are divided into first and second transmission subsets 660, 661 which are alternatively engaged to provide odd number and even number speed ranges, respectively. Transmission subset 660 includes planetary gear set 620, and transmission subset 661 includes planetary gear sets 630 and 640. The output shaft 19 is continuously connected with a member of transmission subset 661.

In this family member, which is a derivative of the family member shown in FIG. 2a, rather than having two input clutches and eleven synchronizers, three input clutches and nine synchronizer are utilized to achieve reduced content. The first input clutch and first and second synchronizers in FIG. 2a are here operatively replaced by a first and a second input clutch 666 and 667, respectively; and the second input clutch in FIG. 2a remains here as a third input clutch 663. The input clutches 663, 666 and 667 are controlled electronically, and the disengaged input clutch is gradually engaged while the engaged input clutch or synchronizer is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All gear speeds are preselected within the transmission subsets 660, 661 prior to engaging the respective input clutch 663, 666, or 667. The preselection is achieved by means of electronically controlled synchronizers. As shown, the planetary gear arrangement includes nine torque transmitting mechanisms 664, 665, 668, 669, 670, 671, 672, 673 and 674. The torque transmitting mechanisms 664, 665, 671 and 672 comprise braking synchronizers (brakes) which connect gears to the transmission housing 680, and the torque transmitting mechanisms 668, 669, 670, 673 and 674 comprise rotating synchronizers.

Accordingly, the input shaft 17 is alternately connected with the first and second transmission subsets 660, 661 (i.e. through the clutch 666 to the planet carrier assembly member 626, through the clutch 667 to the sun gear member 622 and through the clutch 663 to the ring gear member 634). The sun gear member 632 is continuously connected with the sun gear member 642 through the interconnecting member 676.

The planet carrier assembly member 626 is selectively connectable with the transmission housing 680 through the braking synchronizer 664. The ring gear member 624 is selectively connectable with the transmission housing 680 through the braking synchronizer 665. The planet carrier assembly member 626 is selectively connectable with the input shaft 17 through the input clutch 666. The sun gear member 622 is selectively connectable with the input shaft 17 through the input clutch 667. The ring gear member 634 is selectively connectable with the input shaft 17 through the input clutch 663. The ring gear member 624 is selectively connectable with the planet carrier assembly member 636 through the synchronizer 668. The planet carrier assembly member 626 is selectively connectable with the planet carrier assembly member 636 through the synchronizer 669. The sun gear member 622 is selectively connectable with the planet carrier assembly member 636 through the synchronizer 670. The ring gear member 644 is selectively connectable with the transmission housing 680 through the braking synchronizer 671. The planet carrier assembly member 646 is selectively connectable with the transmission housing 680 through the braking synchronizer 672. The planet carrier assembly member 636 is selectively connectable with the ring gear member 644 through the synchronizer 673. The planet carrier assembly member 636 is selectively connectable with the planet carrier assembly member 646 through the synchronizer 674.

As shown in FIG. 7b, and in particular the truth table disclosed therein, the input clutches and torque transmitting mechanisms are selectively engaged in combinations of three to provide six forward speed ratio and a reverse speed ratio. The ratio values given are by way example and are established utilizing the ring gear/sun gear tooth ratios given in FIG. 7b. For example, the R1/S2 value is the tooth ratio of the planetary gear set 620; the R2/S2 value is the tooth ratio of the planetary gear set 630; and the R3/S3 value is the tooth ratio of the planetary gear set 640. The ratio steps between adjacent forward ratios and the reverse to first ratio are also given in FIG. 7b.

Those skilled in the art will, upon reviewing the truth table of FIG. 7b, recognize that the numerical values of the reverse, first and fifth forward speed ratios are determined utilizing the ring gear/sun gear tooth ratio of the planetary gear set 620. The numerical values of the second and sixth forward speed ratios are determined utilizing the ring gear/sun gear tooth ratios of the planetary gear sets 630, 640. The numerical value of the third forward speed ratio is 1. The numerical value of the fourth forward speed ratio is determined utilizing the ring gear/sun gear tooth ratio of the planetary gear set 630.

A powertrain 710, shown in FIG. 8a, has the conventional engine 12, a planetary transmission 714, and the conventional final drive mechanism 16. The engine 12 is continuously connected with the input shaft 17. The planetary transmission 714 is drivingly connected with the final drive mechanism 16 through the output shaft 19. The planetary transmission 714 includes a planetary gear arrangement 718 that has a first planetary gear set 720, a second planetary gear set 730 and a third planetary gear set 740.

The planetary gear set 720 includes a sun gear member 722, a ring gear member 724, and a planet carrier assembly member 726. The planet carrier assembly member 726 includes a plurality of pinion gears 727 rotatably mounted on a carrier member 729 and disposed in meshing relationship with both the sun gear member 722 and the ring gear member 724.

The planetary gear set 730 includes a sun gear member 732, a ring gear member 734, and a planet carrier assembly member 736. The planet carrier assembly member 736 includes a plurality of intermeshing pinion gears 737, 738 rotatably mounted on a carrier member 739 and disposed in meshing relationship with the ring gear member 734 and the sun gear member 732, respectively.

The planetary gear set 740 includes a sun gear member 742, a ring gear member 744, and a planet carrier assembly member 746. The planet carrier assembly member 746 includes a plurality of intermeshing pinion gears 747, 748 rotatably mounted on a carrier member 749 and disposed in meshing relationship with the ring gear member 744 and the sun gear member 742, respectively.

As a result of the dual clutch arrangement of the invention, the four planetary gear sets 720, 730, 740 and 750 are divided into first and second transmission subsets 760, 761 which are alternatively engaged to provide odd number and even number speed ranges, respectively. Transmission subset 760 includes planetary gear set 720, and transmission subset 761 includes planetary gear sets 730 and 740. The output shaft 19 is continuously connected with a member of transmission subset 761.

In this family member, which is a derivative of the family member shown in FIG. 3a, rather than having two input clutches and eleven synchronizers, three input clutches and nine synchronizers are utilized to achieve reduced content. The first input clutch and first and second synchronizers in FIG. 3a are here operatively replaced by a first and second input clutch 766 and 767, and the second input clutch in FIG. 3a remains here as a third input clutch 763. The input clutches 763, 766 and 767 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All gear speeds are preselected within the transmission subsets 760, 761 prior to engaging the respective input clutch 763, 766 or 767. The preselection is achieved by means of electronically controlled synchronizers. As shown, the planetary gear arrangement includes nine torque transmitting mechanisms 764, 765, 768, 769, 770, 771, 772, 773 and 774. The torque transmitting mechanisms 764, 765, 771 and 772 comprise braking synchronizers (brakes) which connect gears to the transmission housing 780, and the torque transmitting mechanisms 768, 769, 770, 773 and 774 comprise rotating synchronizers.

Accordingly, the input shaft 17 is alternately connected with the first and second transmission subsets 760, 761 (i.e. through the clutch 766 to the planet carrier assembly member 726, through the clutch 767 to the sun gear member 722 and through the clutch 763 to the ring gear member 734). The sun gear member 732 is continuously connected with the planet carrier assembly member 746 through the interconnecting member 776.

The planet carrier assembly member 726 is selectively connectable with the transmission housing 780 through the braking synchronizer 764. The ring gear member 724 is selectively connectable with the transmission housing 780 through the braking synchronizer 765. The planet carrier assembly member 726 is selectively connectable with the input shaft 17 through the input clutch 766. The sun gear member 722 is selectively connectable with the input shaft 17 through the input clutch 767. The ring gear member 734 is selectively connectable with the input shaft 17 through the input clutch 763. The ring gear member 724 is selectively connectable with the planet carrier assembly member 736 through the synchronizer 768. The planet carrier assembly member 726 is selectively connectable with the planet carrier assembly member 736 through the synchronizer 769. The sun gear member 722 is selectively connectable with the planet carrier assembly member 736 through the synchronizer 770. The ring gear member 744 is selectively connectable with the transmission housing 780 through the braking synchronizer 771. The sun gear member 742 is selectively connectable with the transmission housing 780 through the braking synchronizer 772. The planet carrier assembly member 736 is selectively connectable with the ring gear member 744 through the synchronizer 773. The planet carrier assembly member 736 is selectively connectable with the sun gear member 742 through the synchronizer 774.

As shown in FIG. 8b, and in particular the truth table disclosed therein, the input clutches and torque transmitting mechanisms are selectively engaged in combinations of three to provide six forward speed ratios and a reverse speed ratio. Also given in the truth table is a set of numerical values that are attainable with the present invention utilizing the ring gear/sun gear tooth ratios given in FIG. 8b. The R1/S1 value is the tooth ratio of the planetary gear set 720; the R2/S2 value is the tooth ratio of the planetary gear set 730; and the R3/S3 value is the tooth ratio of the planetary gear set 740.

FIG. 8b also provides a chart of the ratio steps between adjacent forward ratios and between the reverse and first forward ratio. For example, the ratio step between the first and second forward ratios is 1.85.

Those skilled will recognize that the numerical values of the reverse, first and fifth forward speed ratios are determined utilizing the ring gear/sun gear tooth ratio of the planetary gear set 720. The numerical values of the second and sixth forward speed ratios are determined utilizing the ring gear/sun gear tooth ratios of the planetary gear set 730, 740. The numerical value of the third forward speed ratio is 1. The numerical value of the fourth forward speed ratio is determined utilizing the ring gear/sun gear tooth ratio of the planetary gear set 730.

Figures 9A, 9B:
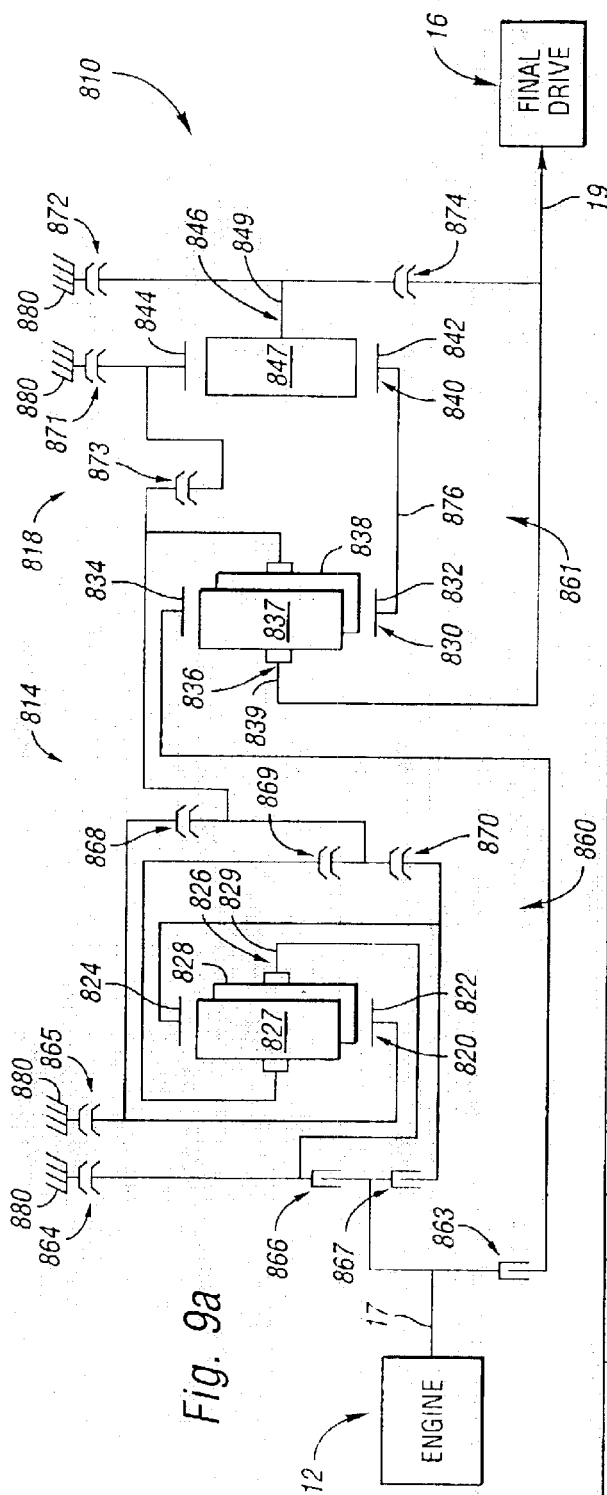

A powertrain 810, shown in FIG. 9a, has the conventional engine 12, a planetary transmission 814, and the final drive mechanism 16. The engine 12 is continuously connected with the input shaft 17. The planetary transmission 814 is drivingly connected with final drive mechanism 16 through output shaft 19. The planetary transmission 814 includes a planetary gear arrangement 818 that has a first planetary gear set 820, a second planetary gear set 830 and a third planetary gear set 840.

The planetary gear set 820 includes a sun gear member 822, a ring gear member 824, and a planet carrier assembly member 826. The planet carrier assembly member 826 includes a plurality of intermeshing pinion gears 827, 828 rotatably mounted on a carrier member 829 and disposed in meshing relationship with the ring gear member 824 and the sun gear member 822, respectively.

The planetary gear set 830 includes a sun gear member 832, a ring gear member 834, and a planet carrier assembly member 836. The planet carrier assembly member 836 includes a plurality of intermeshing pinion gears 837, 838 rotatably mounted on a carrier member 839 and disposed in meshing relationship with the ring gear member 834 and the sun gear member 832, respectively.

The planetary gear set 840 includes a sun gear member 842, a ring gear member 844, and a planet carrier assembly member 846. The planet carrier assembly member 846 includes a plurality of pinion gears 847 rotatably mounted on a carrier member 849 and disposed in meshing relationship with both the sun gear member 842 and the ring gear member 844.

As a result of the dual clutch arrangement of the invention, the four planetary gear sets 820, 830 and 840 are divided into first and second transmission subsets 860, 861 which are alternatively engaged to provide odd number and even number speed ranges, respectively. Transmission subset 860 includes planetary gear set 820, and transmission subset 861 includes planetary gear sets 830 and 840. The output shaft 19 is continuously connected with a member of transmission subset 861.

In this family member, which is a derivative of the family member shown in FIG. 4a, rather than having two input clutches and eleven synchronizers, three input clutches and nine synchronizers are utilized to achieve reduced content. The first input clutch and first and second synchronizers in FIG. 4a are here operatively replaced by a first and second input clutch 866 and 867, and the second input clutch in FIG. 4a remains here as a third input clutch 863. The input clutches 863, 866 and 867 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All gear speeds are preselected within the transmission subsets 860, 861 prior to engaging the respective input clutch 863, 866 or 867. The preselection is achieved by means of electronically controlled synchronizers. As shown, the planetary gear arrangement includes nine torque transmitting mechanisms 864, 865, 868, 869, 870, 871, 872, 873 and 874. The torque transmitting mechanisms 864, 865, 871 and 872 comprise braking synchronizers (brakes) which connect gears to the transmission housing 880, and the torque transmitting mechanisms 868, 869, 870, 873 and 874 comprise rotating synchronizers.

Accordingly, the input shaft 17 is alternately connected with the first and second transmission subsets 860, 861 (i.e. through the clutch 866 to the planet carrier assembly member 826, through the clutch 867 to the ring gear member 824, and through the clutch 863 to the ring gear member 834). The sun gear member 832 is continuously connected with the sun gear member 842 through the interconnecting member 876.

The planet carrier assembly member 826 is selectively connectable with the transmission housing 880 through the braking synchronizer 864. The sun gear member 822 is selectively connectable with the transmission housing 880 through the braking synchronizer 865. The planet carrier assembly member 826 is selectively connectable with the input shaft 17 through the input clutch 866. The ring gear member 824 is selectively connectable with the input shaft 17 through the input clutch 867. The ring gear member 834 is selectively connectable with the input shaft 17 through the input clutch 863. The sun gear member 822 is selectively connectable with the planet carrier assembly member 836 through the synchronizer 868. The planet carrier assembly member 826 is selectively connectable with the planet carrier assembly member 836 through the synchronizer 869. The ring gear member 824 is selectively connectable with the planet carrier assembly member 836 through the synchronizer 870. The ring gear member 844 is selectively connectable with the transmission housing 880 through the braking synchronizer 871. The planet carrier assembly member 846 is selectively connectable with the transmission housing 880 through the braking synchronizer 872. The planet carrier assembly member 836 is selectively connectable with the ring gear member 844 through the synchronizer 873. The planet carrier assembly member 836 is selectively connectable with the planet carrier assembly member 846 through the synchronizer 874.

As shown in FIG. 9b, and in particular the truth table disclosed therein, the input clutches and torque transmitting mechanisms are selectively engaged in combinations of three to provide six forward speed ratios and a reverse speed ratio. A sample of numerical values for the individual ratios is also given in the truth table of FIG. 9b. These numerical values have been calculated using the ring gear/sun gear tooth ratios also given by way of example in FIG. 9b. The R1/S1 value is the tooth ratio of the planetary gear set 820; the R2/S2 value is the tooth ratio of planetary gear set 830; and the R3/S3 value is the tooth ratio of the planetary gear set 840. FIG. 9b also describes the ratio steps between adjacent forward ratios and between the reverse and first forward ratio. For example, the ratio step between the first and second forward ratios is 1.76.

Those skilled in the art of planetary transmissions will recognize that the numerical values of the reverse and first forward speed ratios are determined utilizing the ring gear/sun gear tooth ratios of the planetary gear sets 830, 840. The numerical values of the second, fourth and sixth forward speed ratios are determined utilizing the ring gear/sun gear tooth ratio of the planetary gear set 820. The numerical value of the third forward speed ratio is 1. The numerical value of the fifth forward speed ratio is determined utilizing the ring gear/sun gear tooth ratio of the planetary gear set 830.

Referring to FIG. 10a, a powertrain 910 is shown having a conventional engine 12, a planetary transmission 914, and a conventional final drive mechanism 16. The planetary transmission 914 includes an input shaft 17 connected with the engine 12, a planetary gear arrangement 918, and an output shaft 19 continuously connected with the final drive mechanism 16. The planetary gear arrangement 918 includes three planetary gear sets 920, 930 and 940.

The planetary gear set 920 includes a sun gear member 922, a ring gear member 924, and a planet carrier assembly member 926. The planet carrier assembly member 926 includes a plurality of intermeshing pinion gears 927, 928 rotatably mounted on a carrier member 929 and disposed in meshing relationship with the ring gear member 924 and the sun gear member 922, respectively.

The planetary gear set 930 includes a sun gear member 932, a ring gear member 934, and a planet carrier assembly member 936. The planet carrier assembly member 936 includes a plurality of intermeshing pinion gears 937, 938 rotatably mounted on a carrier member 939 and disposed in meshing relationship with the ring gear member 934 and the sun gear member 932, respectively.

The planetary gear set 940 includes a sun gear member 942, a ring gear member 944, and a planet carrier assembly member 946. The planet carrier assembly member 946 includes a plurality of intermeshing pinion gears 947, 948 rotatably mounted on a carrier member 949 and disposed in meshing relationship with the ring gear member 944 and the sun gear member 942, respectively.

As a result of the dual clutch arrangement of the invention, the four planetary gear sets 920, 930, 940 and 950 are divided into first and second transmission subsets 960, 961 which are alternatively engaged to provide odd number and even number speed ranges, respectively. Transmission subset 960 includes planetary gear set 920, and transmission subset 961 includes planetary gear sets 930 and 940. The output shaft 19 is continuously connected with a member of transmission subset 961.

In this family member, which is a derivative of the family member shown in FIG. 5a, rather than having two input clutches and eleven synchronizers, three input clutches and nine synchronizer are utilized to achieve reduced content. The first input clutch and first and second synchronizers in FIG. 5a are here operatively replaced by a first and second input clutch 966 and 967; and the second input clutch in FIG. 5a remains here as a third input clutch 963. The input clutches 963, 966 and 967 are controlled electronically, and the disengaged input clutch or synchronizer is gradually engaged while the engaged input clutch or synchronizer is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All gear speeds are preselected within the transmission subsets 960, 961 prior to engaging the respective input clutch 963, 966 or 967. The preselection is achieved by means of electronically controlled synchronizers. As shown, the planetary gear arrangement includes eleven torque transmitting mechanisms 964, 965, 968, 969, 970, 971, 972, 973 and 974. The torque transmitting mechanisms 964, 965, 971 and 972 comprise braking synchronizers (brakes) which connect gears to the transmission housing 980, and the torque transmitting mechanisms 968, 969, 970, 973 and 974 comprise rotating synchronizers.

Accordingly, the input shaft 17 is alternately connected with the first and second transmission subsets 960, 961 (i.e. through the clutch 966 to the planet carrier assembly member 926, through the clutch 967 to the ring gear member 924, and through the clutch 963 to the ring gear member 934). The sun gear member 932 is continuously connected with the planet carrier assembly member 946 through the interconnecting member 976.

The planet carrier assembly member 926 is selectively connectable with the transmission housing 980 through the braking synchronizer 964. The sun gear member 922 is selectively connectable with the transmission housing 980 through the braking synchronizer 965. The planet carrier assembly member 926 is selectively connectable with the input shaft 17 through the input clutch 966. The ring gear member 924 is selectively connectable with the input shaft 17 through the input clutch 967. The ring gear member 934 is selectively connectable with the input shaft 17 through the input clutch 963. The sun gear member 922 is selectively connectable with the planet carrier assembly member 936 through the synchronizer 968. The planet carrier assembly member 926 is selectively connectable with the planet carrier assembly member 936 through the synchronizer 969. The ring gear member 924 is selectively connectable with the planet carrier assembly member 936 through the synchronizer 970. The ring gear member 944 is selectively connectable with the transmission housing 980 through the braking synchronizer 971. The sun gear member 942 is selectively connectable with the transmission housing 980 through the braking synchronizer 972. The planet carrier assembly member 936 is selectively connectable with the ring gear member 944 through the synchronizer 973. The planet carrier assembly member 936 is selectively connectable with the sun gear member 942 through the synchronizer 974.

As shown in FIG. 10b, and in particular the truth table disclosed therein, the input clutches and torque transmitting mechanisms are selectively engaged in combinations of three to provide six forward speed ratio and a reverse speed ratio. The truth table also provides a set of examples for the numerical values for each of the reverse and forward speed ratios. These numerical values have been determined utilizing the ring gear/sun gear tooth ratios given in FIG. 10b. The R1/S1 value is the tooth ratio of the planetary gear set 920; the R2/S2 value is the tooth ratio of the planetary gear set 930; and the R3/S3 value is the tooth ratio of the planetary gear set 940.

Those skilled in the art, upon reviewing the engagement combinations, will recognize that the numerical values of the reverse and first forward speed ratios are determined utilizing the ring gear/sun gear tooth ratios of the planetary gear sets 930, 940. The numerical values of the second, fourth and sixth forward speed ratios are determined utilizing the ring gear/sun gear tooth ratio of the planetary gear set 920. The numerical value of the third forward speed ratio is 1. The numerical value of the fifth forward speed ratio is determined utilizing the ring gear/sun gear tooth ratio of the planetary gear set 930.

FIGS. 11a and 11b illustrate a transmission wherein one of the torque transmitting mechanisms from a previously described configuration is eliminated to realize five forward speed ratios and a reverse speed ratio. Specifically, the powertrain 1010, shown in FIG. 11a is identical to that shown in FIG. 1a, except that the synchronizer 72 of FIG. 1a has been eliminated.

The powertrain 1010, shown in FIG. 11a, includes the conventional engine 12, a planetary transmission 1014, and the conventional final drive mechanism 16. The engine 12 is continuously connected with the input shaft 17 of the planetary transmission 1014. The planetary transmission is drivingly connected with the final drive mechanism 16. The planetary transmission 1014 includes a planetary gear arrangement 1018 that has a first planetary gear set 1020, a second planetary gear set 1030 and a third planetary gear set 1040.

The planetary gear set 1020 includes a sun gear member 1022, a ring gear member 1024, and a planet carrier assembly member 1026. The planet carrier assembly member 1026 includes a plurality of pinion gears 1027 rotatably mounted on a carrier member 1029 and disposed in meshing relationship with both the sun gear member 1022 and the ring gear member 1024.

The planetary gear set 1030 includes a sun gear member 1032, a ring gear member 1034, and a planet carrier assembly member 1036. The planet carrier assembly member 1036 includes a plurality of pinion gears 1037 rotatably mounted on a carrier member 1039 and disposed in meshing relationship with both the sun gear member 1032 and the ring gear member 1034.

The planetary gear set 1040 includes a sun gear member 1042, a ring gear member 1044, and a planet carrier assembly member 1046. The planet carrier assembly member 1046 includes a plurality of intermeshing pinion gears 1047, 1048 rotatably mounted on a carrier member 1049 and disposed in meshing relationship with the ring gear member 1044 and the sun gear member 1042, respectively.

As a result of the dual clutch arrangement of the invention, the three planetary gear sets 1020, 1030 and 1040 are divided into first and second transmission subsets 1060, 1061 which are alternatively engaged to provide odd number and even number speed ranges, respectively. Transmission subset 1060 includes planetary gear set 1020, and transmission subset 1061 includes planetary gear sets 1030 and 1040. The output shaft 19 is continuously connected with a member of transmission subset 1061.

As mentioned above, the first and second input clutches 1062, 1063 are alternatively engaged for transmitting power from the input shaft 17 to transmission subset 1060 or transmission subset 1061. The first and second input clutches 1062, 1063 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All gear speeds are preselected within the transmission subsets 1060, 1061 prior to engaging the respective input clutches 1062, 1063. The preselection is achieved by means of electronically controlled synchronizers. As shown, the planetary gear arrangement includes ten torque transmitting mechanisms 1064, 1065, 1066, 1067, 1068, 1069, 1070, 1071, 1073 and 1074. The torque transmitting mechanisms 1064, 1065 and 1071 comprise braking synchronizers (brakes) which connect gears to the transmission housing 1080, and the torque transmitting mechanisms 1066, 1067, 1068, 1069, 1070, 1073 and 1074 comprise rotating synchronizers.

Accordingly, the input shaft 17 is alternately connected with the first and second transmission subsets 1060, 1061 (i.e. through the clutch 1062 to the synchronizers 1066 and 1067, and through the clutch 1063 to the sun gear member 1032). The planet carrier assembly member 1036 is continuously connected with the ring gear member 1044 through the interconnecting member 1076.

The planet carrier assembly member 1026 is selectively connectable with the transmission housing 1080 through the braking synchronizer 1064. The ring gear member 1024 is selectively connectable with the transmission housing 1080 through the braking synchronizer 1065. The planet carrier assembly member 1026 is selectively connectable with the input shaft 17 through the input clutch 1062 and the synchronizer 1066. The sun gear member 1022 is selectively connectable with the input shaft 17 through the input clutch 1062 and the synchronizer 1067. The ring gear member 1024 is selectively connectable with the planet carrier assembly member 1036 through the synchronizer 1068. The planet carrier assembly member 1026 is selectively connectable with the planet carrier assembly member 1036 through the synchronizer 1069. The sun gear member 1022 is selectively connectable with the planet carrier assembly member 1036 through the synchronizer 1070. The planet carrier assembly member 1046 is selectively connectable with the transmission housing 1080 through the braking synchronizer 1071. The ring gear member 1034 is selectively connectable with the planet carrier assembly member 1046 through the synchronizer 1073. The ring gear member 1034 is selectively connectable with the sun gear member 1042 through the synchronizer 1074.

As shown in FIG. 11*b*, and in particular the truth table disclosed therein, the input clutches and torque transmitting mechanisms are selectively engaged in combinations of at least three to provide five forward speed ratios and a reverse speed ratio. A sample of the numerical values for the ratios is also provided in the truth table of the FIG. 11*b*. These values are determined utilizing the ring gear/sun gear tooth ratios also given in FIG. 11*b*. The R1/S1 value is the tooth ratio of the planetary gear set 1020; the R2/S2 value is the tooth ratio of the planetary gear set 1030; and the R3/S3 value is the tooth ratio of the planetary gear set 1040. Also given in FIG. 11*b* is a chart describing the step ratios between the adjacent forward speed ratios and the reverse to first forward speed ratio.

Those skilled in the art will recognize that the numerical values of the reverse, first and fifth forward speed ratios are determined utilizing the ring gear/sun gear tooth ratio of the planetary gear set 1020. The numerical value of the second forward speed ratio is determined utilizing the ring gear/sun gear tooth ratio of the planetary gear set 1030. The numerical value of the third forward speed ratio is 1. The numerical value of the fourth forward speed ratio is determined utilizing the ring gear/sun gear tooth ratios of the planetary gear sets 1030, 1040.

FIGS. 12*a* and 12*b* illustrate a transmission wherein two of the torque transmitting mechanisms from a previously described configuration are eliminated to realize five forward speed ratios and a reverse speed ratio. Specifically, the powertrain 1110, shown in FIG. 11*a* is identical to that shown in FIG. 4*a*, except that the synchronizers 364 and 368 of FIG. 4*a* have been eliminated.

The powertrain 1110, shown in FIG. 12*a*, includes the conventional engine 12, a planetary transmission 1114, and the conventional final drive mechanism 16. The engine 12 is continuously connected with the input shaft 17 of the planetary transmission 1114. The planetary transmission is drivingly connected with the final drive mechanism 16. The planetary transmission 1114 includes a planetary gear arrangement 1118 that has a first planetary gear set 1120, a second planetary gear set 1130 and a third planetary gear set 1140.

The planetary gear set 1120 includes a sun gear member 1122, a ring gear member 1124, and a planet carrier assembly member 1126. The planet carrier assembly member 1126 includes a plurality of intermeshing pinion gears 1127, 1128 rotatably mounted on a carrier member 1129 and disposed in meshing relationship with the ring gear member 1124 and the sun gear member 1122, respectively.

The planetary gear set 1130 includes a sun gear member 1132, a ring gear member 1134, and a planet carrier assembly member 1136. The planet carrier assembly member 1136 includes a plurality of intermeshing pinion gears 1137, 1138 rotatably mounted on a carrier member 1139 and disposed in meshing relationship with the ring gear member 1134 and the sun gear member 1132, respectively.

The planetary gear set 1140 includes a sun gear member 1142, a ring gear member 1144, and a planet carrier assembly member 1146. The planet carrier assembly member 1146 includes a plurality of pinion gears 1147 rotatably mounted on a carrier member 1149 and disposed in meshing relationship with both the sun gear member 1142 and the ring gear member 1144.

As a result of the dual clutch arrangement of the invention, the three planetary gear sets 1120, 1130 and 1140 are divided into first and second transmission subsets 1160, 1161 which are alternatively engaged to provide odd number and even number speed ranges, respectively. Transmission subset 1160 includes planetary gear set 1120, and transmission subset 1161 includes planetary gear sets 1130 and 1140. The output shaft 19 is continuously connected with a member of transmission subset 1161.

As mentioned above, the first and second input clutches 1162, 1163 are alternatively engaged for transmitting power from the input shaft 17 to transmission subset 1160 or transmission subset 1161. The first and second input clutches 1162, 1163 are controlled electronically, and the disengaged input clutch is gradually engaged while the engaged input clutch is gradually disengaged to facilitate transfer of power from one transmission subset to another. In this manner, shift quality is maintained, as in an automatic transmission, while providing better fuel economy because no torque converter is required, and hydraulics associated with "wet" clutching are eliminated. All gear speeds are preselected within the transmission subsets 1160, 1161 prior to engaging the respective input clutches 1162, 1163. The preselection is achieved by means of electronically controlled synchronizers. As shown, the planetary gear arrangement includes nine torque transmitting mechanisms 1165, 1166, 1167, 1169, 1170, 1171, 1172, 1173 and 1174. The torque transmitting mechanisms 1165, 1171 and 1172 comprise braking synchronizers (brakes) which connect gears to the transmission housing 1180, and the torque transmitting mechanisms 1166, 1167, 1169, 1170, 1173 and 1174 comprise rotating synchronizers.

Accordingly, the input shaft 17 is alternately connected with the first and second transmission subsets 1160, 1161 (i.e. through the clutch 1162 to the synchronizers 1166 and 1167, and through the clutch 1163 to the ring gear member 1134). The sun gear member 1132 is continuously connected with the sun gear member 1142 through the interconnecting member 1176.

The sun gear member 1122 is selectively connectable with the transmission housing 1180 through the braking synchronizer 1165. The planet carrier assembly member 1126 is selectively connectable with the input shaft 17 through the input clutch 1162 and the synchronizer 1166. The ring gear member 1124 is selectively connectable with the input shaft 17 through the input clutch 1162 and the synchronizer 1167. The planet carrier assembly member 1126 is selectively connectable with the planet carrier assembly member 1136 through the synchronizer 1169. The ring gear member 1124 is selectively connectable with the planet carrier assembly member 1136 through the synchronizer 1170. The ring gear member 1144 is selectively connectable with the transmission housing 1180 through the braking synchronizer 1171. The planet carrier assembly member 1146 is selectively connectable with the transmission housing 1180 through the braking synchronizer 1172. The planet carrier assembly member 1136 is selectively connectable with the ring gear member 1144 through the synchronizer 1173. The planet carrier assembly member 1136 is selectively connectable with the planet carrier assembly member 1146 through the synchronizer 1174.

As shown in FIG. 12b, and in particular the truth table disclosed therein, the input clutches and torque transmitting mechanisms are selectively engaged in combinations of at least three to provide five forward speed ratios and a reverse speed ratio. A sample of the numerical values for the ratios is also provided in the truth table of the FIG. 12b. These values are determined utilizing the ring gear/sun gear tooth ratios also given in FIG. 12b. The R1/S1 value is the tooth ratio of the planetary gear set 1120; the R2/S2 value is the tooth ratio of the planetary gear set 1130; and the R3/S3 value is the tooth ratio of the planetary gear set 1140. Also given in FIG. 12b is a chart describing the step ratios between the adjacent forward speed ratios and the reverse to first forward speed ratio.

Those skilled in the art will recognize that the numerical values of the reverse and first forward speed ratio are determined utilizing the ring gear/sun gear tooth ratios of the planetary gear sets 1130, 1140. The numerical values of the second and fourth forward speed ratios are determined utilizing the ring gear/sun gear tooth ratio of the planetary gear set 1120. The numerical value of the third forward speed ratio is 1. The numerical value of the fifth forward speed ratio is determined utilizing the ring gear/sun gear tooth ratio of the planetary gear set 1130.

While the best modes for carrying out the invention have been described in detail, those familiar with the art to which this invention relates will recognize various alternative designs and embodiments for practicing the invention within the scope of the appended claims.

What is claimed is:
1. A multi-speed transmission comprising:
an input shaft;
an output shaft;
first, second and third planetary gear sets each having first, second and third members;
a first and second input clutch connected with said input shaft;
a first and second torque-transmitting mechanism selectively interconnecting a first member and a second member of said first planetary gear set, respectively, with said first input clutch;
a third, fourth and fifth torque-transmitting mechanism selectively interconnecting said first, second and third members of said first planetary gear set, respectively, with said first member of said second planetary gear set and said output shaft;
said second member of said second planetary gear set being continuously connected with said second input clutch;
a sixth and seventh torque-transmitting mechanism selectively interconnecting said first or third member of said second planetary gear set with said first and second members of said third planetary gear set, respectively;
an eighth and ninth torque-transmitting mechanism selectively interconnecting said second and third members of said first planetary gear set, respectively, with a stationary member;
a tenth and eleventh torque-transmitting mechanism selectively interconnecting said first and second members of said third planetary gear set, respectively, with said stationary member;
an interconnecting member continuously interconnecting a member of said second planetary gear set with said third member of said third planetary gear set; and
said input clutches and torque-transmitting mechanisms being engaged in combinations of at least three to provide at least six forward speed ratios and a reverse speed ratio.

2. The transmission defined in claim 1, wherein said eleven torque-transmitting mechanisms comprise synchronizers.

3. The transmission defined in claim 1, wherein said first input clutch is applied for odd number speed ranges and said second input clutch is applied for even number speed ranges.

4. The transmission defined in claim 1, wherein said first input clutch is applied for even number speed ranges and said second input clutch is applied for odd number speed ranges.

5. The transmission defined in claim 1, wherein said first input clutch and said second input clutch are interchangeable to shift from odd number speed ranges to even number speed ranges, and vice versa.

6. The transmission defined in claim 1, wherein selected ones of said eleven torque-transmitting mechanisms are engaged prior to gear shifting to achieve shifting without torque interruptions.

7. The transmission defined in claim 1, wherein said torque-transmitting mechanisms comprise synchronizers, and wherein at least two of said synchronizers comprise a double synchronizer to reduce cost and package size.

8. A multi-speed transmission comprising:
an input shaft;
an output shaft;
a stationary member;
first, second and third planetary gear sets each having first, second and third members;

a first and second input clutch connected with said input shaft;

said second member of said second planetary gear set being continuously connected with said second input clutch;

an interconnecting member continuously interconnecting a member of said second planetary gear set with said third member of said third planetary gear set; and eleven torque-transmitting mechanisms for selectively interconnecting said members of said planetary gear sets with said first input clutch, with said stationary member, or with other members of said planetary gear sets in pairs for common rotation, said eleven torque-transmitting mechanisms and said input clutches being engaged in combinations of at least three to establish at least six forward speed ratios and a reverse speed ratio between said input shaft and said output shaft.

9. The transmission defined in claim 8, wherein the first and second of said eleven torque-transmitting mechanisms are operable for selectively interconnecting a first member and a second member of said first planetary gear set, respectively, with said first input clutch.

10. The transmission defined in claim 8, wherein the third, fourth and fifth of said eleven torque-transmitting mechanisms are operable for selectively interconnecting said first, second and third members of said first planetary gear set, respectively, with said first member of said second planetary gear set and said output shaft.

11. The transmission defined in claim 8, wherein the sixth and seventh of said eleven torque-transmitting mechanisms are operable for selectively interconnecting said first or third member of said second planetary gear set with said first and second members of said third planetary gear set, respectively.

12. The transmission defined in claim 8, wherein the eighth and ninth of said eleven torque-transmitting mechanisms are operable for selectively interconnecting said second and third members of said first planetary gear set, respectively, with said stationary member.

13. The transmission defined in claim 8, wherein the tenth and eleventh of said eleven torque-transmitting mechanisms are operable for selectively interconnecting said first and second members of said third planetary gear set, respectively, with said stationary member.

14. The transmission defined in claim 8, wherein said first, second and third members of said planetary gear sets comprise a sun gear member, a ring gear member and a planet carrier assembly member, and wherein planet carrier assembly members of a plurality of said planetary gear sets are single pinion carriers.

15. The transmission defined in claim 8, wherein said first, second and third members of said planetary gear sets comprise a sun gear member, a ring gear member and a planet carrier assembly member, and wherein planet carrier assembly members of a plurality of said planetary gear sets are double pinion carriers.

16. The transmission defined in claim 8, wherein each of said eleven torque-transmitting mechanisms comprises a synchronizer.

17. The transmission defined in claim 8, wherein said first input clutch is applied for odd number speed ranges and said second input clutch is applied for even number speed ranges.

18. The transmission defined in claim 8, wherein said first input clutch is applied for even number speed ranges and said second input clutch is applied for odd number speed ranges.

19. The transmission defined in claim 8, wherein selected ones of said eleven torque-transmitting mechanisms are engaged prior to gear shifting to achieve shifting without torque interruptions.

20. A multi-speed transmission comprising:

an input shaft;

an output shaft;

first, second and third planetary gear sets each having first, second and third members;

a first input clutch selectively interconnecting said second member of said second planetary gear set with said input shaft;

a first and second torque-transmitting mechanism selectively interconnecting a first member and a second member of said first planetary gear set, respectively, with said input shaft and, a third, fourth and fifth torque-transmitting mechanism selectively interconnecting said first, second and third members of said first planetary gear set, respectively, with said first member of said second planetary gear set and said output shaft;

a sixth and seventh torque-transmitting mechanism selectively interconnecting said first or third member of said second planetary gear set with said first and second members of said third planetary gear set, respectively;

an eighth and ninth torque-transmitting mechanism selectively interconnecting said second and third members of said first planetary gear set, respectively, with a stationary member;

a tenth and eleventh torque-transmitting mechanism selectively interconnecting said first and second members of said third planetary gear set, respectively, with said stationary member;

an interconnecting member continuously interconnecting a member of said second planetary gear set with said third member of said third planetary gear set; and said input clutches and torque-transmitting mechanisms being engaged in combinations of at least three to provide at least six forward speed ratios and a reverse speed ratio.

21. The transmission defined in claim 20, wherein nine of said eleven torque-transmitting mechanisms comprise synchronizer, and two of said eleven torque-transmitting mechanisms comprise second and third input clutches.

22. The transmission defined in claim 21, wherein said first input clutch is applied for odd number speed ranges and said second or third input clutch is selectively applied for even number speed ranges.

23. The transmission defined in claim 21, wherein said first input clutch is applied for even number speed ranges and said second or third input clutch is selectively applied for odd number speed ranges.

24. The transmission defined in claim 21, wherein said first input clutch and said second or third input clutch are interchangeable to shaft from odd number speed ranges to even number speed ranges, and vice versa.

25. The transmission defined in claim 20, wherein selected ones of said torque-transmitting mechanisms are engaged prior to gear shifting to achieve shifting without torque interruptions.

26. The transmission defined in claim 21, wherein at least two of said synchronizers comprise a double synchronizer to reduce cost and package size.

* * * * *